(12) United States Patent
Suzuki

(10) Patent No.: US 12,126,775 B2
(45) Date of Patent: Oct. 22, 2024

(54) INSPECTING A PRINT IMAGE AND AN OBJECT THEREOF TO ENABLE A USER TO SET A SUITABLE INSPECTION CONDITION

(71) Applicant: SCREEN HOLDINGS CO., LTD., Kyoto (JP)

(72) Inventor: Tomohiro Suzuki, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 48 days.

(21) Appl. No.: 17/885,068

(22) Filed: Aug. 10, 2022

(65) Prior Publication Data

US 2023/0088442 A1    Mar. 23, 2023

(30) Foreign Application Priority Data

Sep. 21, 2021   (JP) .................................. 2021-152910

(51) Int. Cl.
*H04N 1/00* (2006.01)
*G06T 7/00* (2017.01)

(52) U.S. Cl.
CPC ......... *H04N 1/0044* (2013.01); *G06T 7/0004* (2013.01); *H04N 1/00005* (2013.01); *H04N 1/00029* (2013.01); *H04N 1/00076* (2013.01); *G06T 2207/20081* (2013.01); *G06T 2207/30144* (2013.01)

(58) Field of Classification Search
None
See application file for complete search history.

(56) References Cited

U.S. PATENT DOCUMENTS

| 2013/0177232 A1* | 7/2013 | Hirano | G06T 7/0004 |
| | | | 382/141 |
| 2014/0270397 A1 | 9/2014 | Sochi | |
| 2016/0142560 A1 | 5/2016 | Shijoh | |
| 2017/0274690 A1 | 9/2017 | Ukishima | |
| 2019/0105895 A1 | 4/2019 | Muehl et al. | |
| 2019/0154590 A1 | 5/2019 | Yamazaki | |
| 2019/0291461 A1 | 9/2019 | Neeb et al. | |

(Continued)

FOREIGN PATENT DOCUMENTS

| JP | 4140472 B2 | 8/2008 |
| JP | 2016-103815 A | 6/2016 |

(Continued)

*Primary Examiner* — Eric A. Rust
(74) *Attorney, Agent, or Firm* — Rimon P.C.

(57) ABSTRACT

An image inspection device includes: an inspection condition setting unit for setting, as an inspection condition, a determination criterion when detecting a defective image; an imaging unit that performs capturing a print image and outputs a captured image obtained by the capturing; and a defective image detection unit that detects a defective image from the captured image on the basis of the inspection condition. The inspection condition setting unit is configured to be able to set, as the inspection condition, first parameter values and second parameter values that are two different determination criteria. The defective image detection unit performs first detection processing of detecting a defective image from the captured image on the basis of the first parameter values and second detection processing of detecting a defective image from the captured image on the basis of the second parameter values.

19 Claims, 30 Drawing Sheets

(56) References Cited

U.S. PATENT DOCUMENTS

| | | | |
|---|---|---|---|
| 2020/0223230 A1 | 7/2020 | Krieger et al. | |
| 2022/0172334 A1* | 6/2022 | Takeuchi | G06T 7/0002 |
| 2022/0318982 A1* | 10/2022 | Osunkwo | G06N 3/0464 |

FOREIGN PATENT DOCUMENTS

| | | | |
|---|---|---|---|
| JP | 2017-177358 A | 10/2017 | |
| JP | 6232999 B2 | 11/2017 | |
| JP | 2018-017673 A | 2/2018 | |
| JP | 2020-163572 A | 10/2020 | |

\* cited by examiner

INSPECTING A PRINT IMAGE AND AN OBJECT THEREOF TO ENABLE A USER TO SET A SUITABLE INSPECTION CONDITION

CROSS REFERENCE TO RELATED APPLICATION

This application claims the benefit of Japanese Application No. 2021-152910, filed on Sep. 21, 2021, the entire contents of each are hereby incorporated by reference.

BACKGROUND OF THE INVENTION

Field of the Invention

The present invention relates to an image inspection device that inspects a print image.

Description of Related Art

In recent years, there has been a strong demand for improvement in quality of a printed matter, and accordingly, the importance of inspection of printed matter has increased. Therefore, an inkjet printing device including an image inspection device that inspects a print image (image obtained by printing on a base material such as printing paper) has become widespread. For example, the image inspection device compares and collates a captured image obtained by capturing a print image with a camera and an original image corresponding to data of a print source, thereby detecting a defect (defective image) such as ink contamination or a white streak (streak-like image caused by missing ink at the time of printing) in real time. A sheet including a defect is discarded, for example, as spoilage and becomes a target of reprinting.

Among the defects detected in the inspection by the image inspection device, there are some defects each having a high fatal degree that are unacceptable as final products, and other defects each having a low fatal degree that are negligible in some cases. As the defect having a high fatal degree, there are exemplified contamination due to ink dripping, chipping of a plurality of nozzles, contamination on paper white, or the like. As the defect having a low fatal degree, there are exemplified scumming of printing paper, chipping of a single nozzle, contamination on a high-density image, or the like. However, what kind of defect becomes a defect having a high fatal degree varies, depending on a request level for print quality of an orderer of the printed matter.

In order to execute inspection by the image inspection device, a user (worker) needs to set an inspection condition for specifying a defect (defective image). Usually, setting of the inspection condition is performed by the user specifying values of parameters (size of defective portion, gradation difference, and the like). The values of the parameters (values specified by the user) are threshold values when the image inspection device determines whether or not an image under inspection is regarded as a defective image.

Here, a relationship between strictness of the inspection condition and a defect to be detected will be described with reference to FIG. 34. In FIG. 34, attention is paid to five levels (L1 to L5) as strictness levels of the inspection condition (hereinafter, each of the strictness levels of the inspection condition is abbreviated as "inspection levels"). A portion denoted by reference sign 91 represents a range in which no defect is detected, a portion denoted by reference sign 92 represents a range in which a defect having a high fatal degree is detected, and a portion denoted by reference sign 93 represents a range in which a defect having a low fatal degree is detected. If the inspection level is less than L1, no defect is detected. If the inspection level is L2, half of defects each having a high fatal degree are detected. If the inspection level is L3, all the defects each having a high fatal degree are detected. If the inspection level is L4, in addition to all the defects each having a high fatal degree, half of defects each having a low fatal degree are detected. If the inspection level is L5, in addition to all the defects each having a high fatal degree, all the defects each having a low fatal degree are detected. As above, as the inspection condition is made stricter, more defects are detected by the inspection. Note that a portion denoted by reference sign 94 in FIG. 34 is used in similar meaning in other drawings (FIGS. 9 to 12, 14, 15, 30 to 33, and 35 to 37).

In relation to the present invention, Japanese Laid-Open Patent Publication No. 2016-103815 discloses an invention of an inspection device including a change unit that changes threshold information (inspection condition) so as to resolve a contradiction in a case where the contradiction occurs between an inspection result by an inspection unit and an inspection result by visual observation of a user.

According to the conventional image inspection device, as described above, the defect is detected in accordance with the inspection condition (parameter values) set by the user. In this regard, while the inspection condition needs to be appropriately set in order to detect the defect as desired by the user, in general, the user needs to adjust the values of many parameters in order to set the inspection condition. Therefore, it is difficult for the user to appropriately set the inspection condition, and as a result, a printing accident (delivering a defective printed matter to an orderer) and wasteful disposal of the printed matter occurs. This will be described with reference to FIGS. 35 to 37.

Here, it is assumed that all the defects each having a high fatal degree cannot be accepted as final products, and all the defects each having a low fatal degree can be accepted as final products. If the inspection condition is set such that a range denoted by reference sign 94 in FIG. 35 is the inspection range, while the defect having a low fatal degree is not detected at all by the inspection, all the defects each having a high fatal degree are detected. This is an ideal inspection result. If the inspection level is lower than that of a case shown in FIG. 35, that is, if the inspection is performed under an inspection condition looser than that of the case shown in FIG. 35, for example, a range denoted by reference sign 95 in FIG. 36 is the inspection range. At this time, no defect having a high fatal degree corresponding to a range denoted by reference sign 96 in FIG. 36 is detected by the inspection. As a result, a printing accident occurs. On the other hand, if the inspection level is higher than that in the case shown in FIG. 35, that is, when the inspection is performed under the inspection condition stricter than that in the case shown in FIG. 35, for example, a range denoted by reference sign 97 in FIG. 37 is the inspection range. At this time, in addition to all the defects each having a high fatal degree, defects each having a low fatal degree corresponding to a range denoted by reference sign 98 in FIG. 37 are detected by the inspection. As a result, wasteful disposal of a printed matter occurs (in a case where operation of discarding a sheet including the defect detected by the inspection without performing visual confirmation work by the user is adopted).

In addition, according to the invention disclosed in Japanese Laid-Open Patent Publication No. 2016-103815, the user needs to designate a region (gap region) in which a contradiction occurs between the inspection result by the inspection unit and the inspection result by visual observation of the user. In this regard, if there are a large number of gap regions, the user needs to perform an operation to designate all the gap regions one by one, and this operation puts a heavy burden on the user. In addition, work of visually detecting a region that should be as a defective region from regions determined to be non-defective regions in the inspection result by the inspection unit also puts a heavy burden on the user.

SUMMARY OF THE INVENTION

In view of the above circumstances, the present invention relates to an image inspection device that inspects a print image, and an object thereof is to enable a user to easily set a suitable inspection condition.

One aspect of the present invention is directed to an image inspection device configured to perform inspection to detect a defective image included in a print image, the image inspection device including:
  an inspection condition setting unit for setting a determination criterion when detecting a defective image, the determination criterion being set as an inspection condition;
  an imaging unit configured to perform capturing the print image and output a captured image obtained by the capturing; and
  a defective image detection unit configured to detect a defective image from the captured image on the basis of the inspection condition,
  wherein the inspection condition setting unit is configured to be able to set, as the inspection condition, a first parameter value and a second parameter value that are two different determination criteria, and
  the defective image detection unit performs first detection processing of detecting a defective image from the captured image on the basis of the first parameter value, and second detection processing of detecting a defective image from the captured image on the basis of the second parameter value.

According to such a configuration, the user can set the two inspection conditions (first parameter value and second parameter value) regarding the inspection for detecting the defective image included in the print image. The defective image detection unit performs the first detection processing of detecting a defective image on the basis of the first parameter value and the second detection processing of detecting a defective image on the basis of the second parameter value. This makes it possible to obtain the results of the inspection under the two different inspection conditions. Therefore, for example, validity of the result of the inspection treated as the main inspection can be determined, and the inspection condition can also be easily adjusted. In view of the foregoing, regarding an image inspection device that inspects a print image, a user can easily set a suitable inspection condition.

Another aspect of the present invention is directed to a printing device including:
  a conveyance unit configured to convey a base material;
  a printing unit configured to perform printing based on print data on the base material conveyed by the conveyance unit;
  an image inspection device configured to perform inspection to detect a defective image included in a print image,
  wherein the image inspection device has:
    an inspection condition setting unit for setting a determination criterion when detecting a defective image, the determination criterion being set as an inspection condition;
    an imaging unit placed so that the print image obtained by the printing by the printing unit can be captured, and configured to perform capturing the print image and output a captured image obtained by the capturing; and
    a defective image detection unit configured to detect a defective image from the captured image on the basis of the inspection condition,
    the inspection condition setting unit is configured to be able to set, as the inspection condition, a first parameter value and a second parameter value that are two different determination criteria, and
    the defective image detection unit performs first detection processing of detecting a defective image from the captured image on the basis of the first parameter value, and second detection processing of detecting a defective image from the captured image on the basis of the second parameter value.

A still another aspect of the present invention is directed to an image inspection method for performing inspection to detect a defective image included in a print image, the method including:
  an inspection condition setting step of setting, by a worker, a determination criterion when detecting a defective image, the determination criterion being set as an inspection condition;
  an imaging step of capturing, by an imaging device, the print image; and
  a defective image detection step of detecting, by a computer, a defective image from a captured image obtained in the imaging step on the basis of the inspection condition,
  wherein in the inspection condition setting step, at least one of a first parameter value and a second parameter value that are two different determination criteria as the inspection condition is set by the worker, and
  in the defective image detection step, first detection processing of detecting a defective image from the captured image on the basis of the first parameter value, and second detection processing of detecting a defective image from the captured image on the basis of the second parameter value are performed.

These and other objects, features, modes, and advantageous effects of the present invention will become more apparent from the following detailed description of the present invention with reference to the accompanying drawings.

DETAILED DESCRIPTION OF PREFERRED EMBODIMENTS

Hereinafter, embodiments of the present invention will be described with reference to the accompanying drawings.

1. First Embodiment

1.1 Overall Configuration of Printing System

Figure 1:
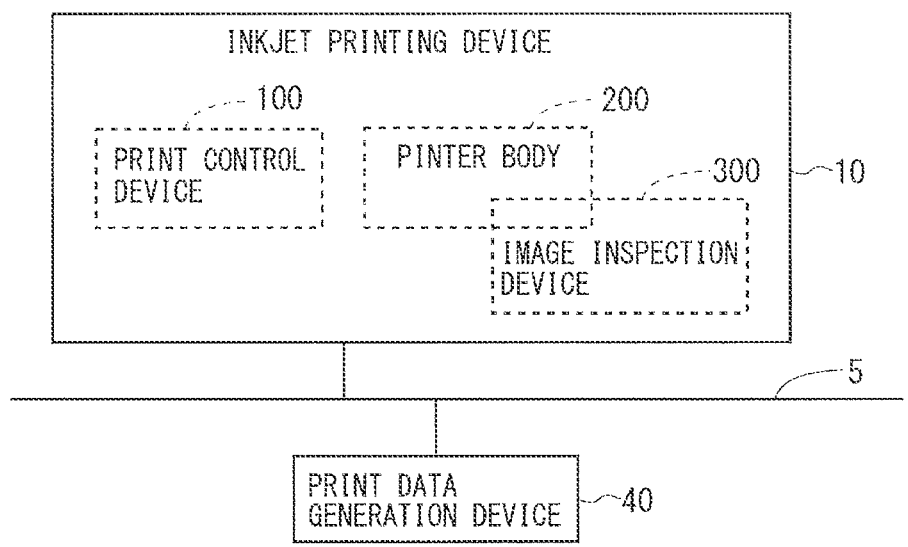
FIG. 1 is an overall configuration diagram of a printing system according to a first embodiment of the present invention.

FIG. 1 is an overall configuration diagram of a printing system according to a first embodiment of the present invention. The printing system includes an inkjet printing device 10 and a print data generation device 40. The inkjet printing device 10 and the print data generation device 40 are connected to each other by a communication line 5. The print data generation device 40 performs RIP processing or the like on submitted data such as a PDF file to generate print data. The print data generated by the print data generation device 40 is transmitted to the inkjet printing device 10 via the communication line 5. The inkjet printing device 10 outputs a print image by ejecting ink onto a printing paper that is a base material on the basis of the print data transmitted from the print data generation device 40 without using a printing plate (that is, the inkjet printing device 10 performs printing.). The inkjet printing device 10 includes a printer body 200, a print control device 100 that controls operation of the printer body 200, and an image inspection device 300 that inspects a printing state. That is, the inkjet printing device 10 is a printing device with an inspection function. Some components of the image inspection device 300 are incorporated in the printer body 200.

Note that in a configuration shown in FIG. 1, the image inspection device 300 is one component of the inkjet printing device 10 (that is, the image inspection device 300 is included in the inkjet printing device 10), but is not limited thereto. The image inspection device 300 may be one device independent of the inkjet printing device 10.

1.2 Configuration of Inkjet Printing Device

Figure 2:
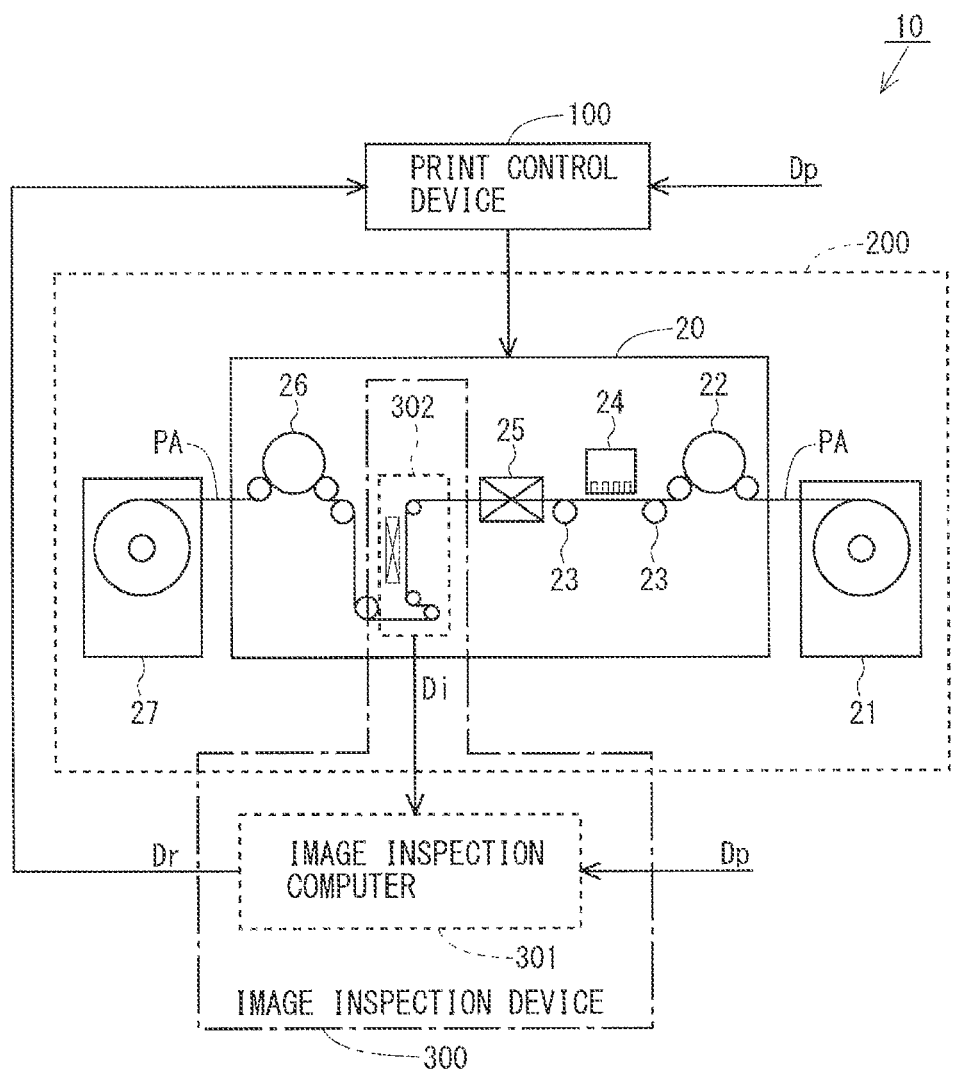
FIG. 2 is a schematic diagram showing one configuration example of an inkjet printing device according to the first embodiment.

FIG. 2 is a schematic diagram showing one configuration example of the inkjet printing device 10. As described above, this inkjet printing device 10 includes the print control device 100 and the printer body 200, and the image inspection device 300.

The printer body 200 includes a paper feeding unit 21 that supplies printing paper (for example, roll paper) PA, a printing mechanism 20 that performs printing on the printing paper PA, and a paper winding unit 27 that winds the printing paper PA after printing. The printing mechanism 20 includes a first driving roller 22 for conveying the printing paper PA to an inside, a plurality of support rollers 23 for conveying the printing paper PA inside the printing mechanism 20, a printing unit 24 that ejects ink onto the printing paper PA to perform printing, a drying unit 25 that dries the printing paper PA after printing, a camera (imaging device) 302 that captures a print image (printing paper PA after printing), and a second driving roller 26 for outputting the printing paper PA from the inside of the printing mechanism 20. The camera 302 is a component of the image inspection device 300, and is configured by using an image sensor such as a CCD or a CMOS. The printing unit 24 includes, for example, a C inkjet head, an M inkjet head, a Y inkjet head, and a K inkjet head that respectively eject C (cyan), M (magenta), Y (yellow), and K (black) inks. Note that the first driving roller 22, the plurality of support rollers 23, and the second driving roller 26 realize a conveyance unit.

The print control device 100 controls the operation of the printer body 200 having the above configuration. When a print output instruction command is given to the print control device 100, the print control device 100 controls operation of the printer body 200 so that the printing paper PA is conveyed from the paper feeding unit 21 to the paper winding unit 27. Then, first, printing is performed on the printing paper PA by the printing unit 24, next, the printing paper PA is dried by the drying unit 25, and finally, a print image is captured by the camera 302.

The image inspection device 300 includes an image inspection computer 301 and the camera 302. The camera 302 is disposed so as to be able to capture the print image obtained by printing by the printing unit 24. Captured image data Di obtained by capturing the print image by the camera 302 is sent to the image inspection computer 301. The image inspection computer 301 performs inspection for detecting a defect (defective image) on the basis of the captured image data Di. The defect is detected by image analysis based on the captured image data Di, comparison and collation between the captured image data Di and print data Dp (however, data converted from a CMYK format to a RGB format) transmitted from the print data generation device 40, or the like. An inspection result Dr obtained by the image inspection computer 301 is sent to the print control device 100.

Although the configuration of the inkjet printing device 10 that performs color printing is described here, the present invention can also be applied to a case where an inkjet printing device that performs monochrome printing is adopted. Moreover, although the configuration of the inkjet printing device 10 using aqueous ink has been exemplified here, the present invention can also be applied to, for example, a case where an inkjet printing device using UV ink (ultraviolet curing ink) such as an inkjet printing device for label printing is adopted.

1.3 Configuration of Image Inspection Device

1.3.1 Hardware Configuration of Image Inspection Computer

Figure 3:
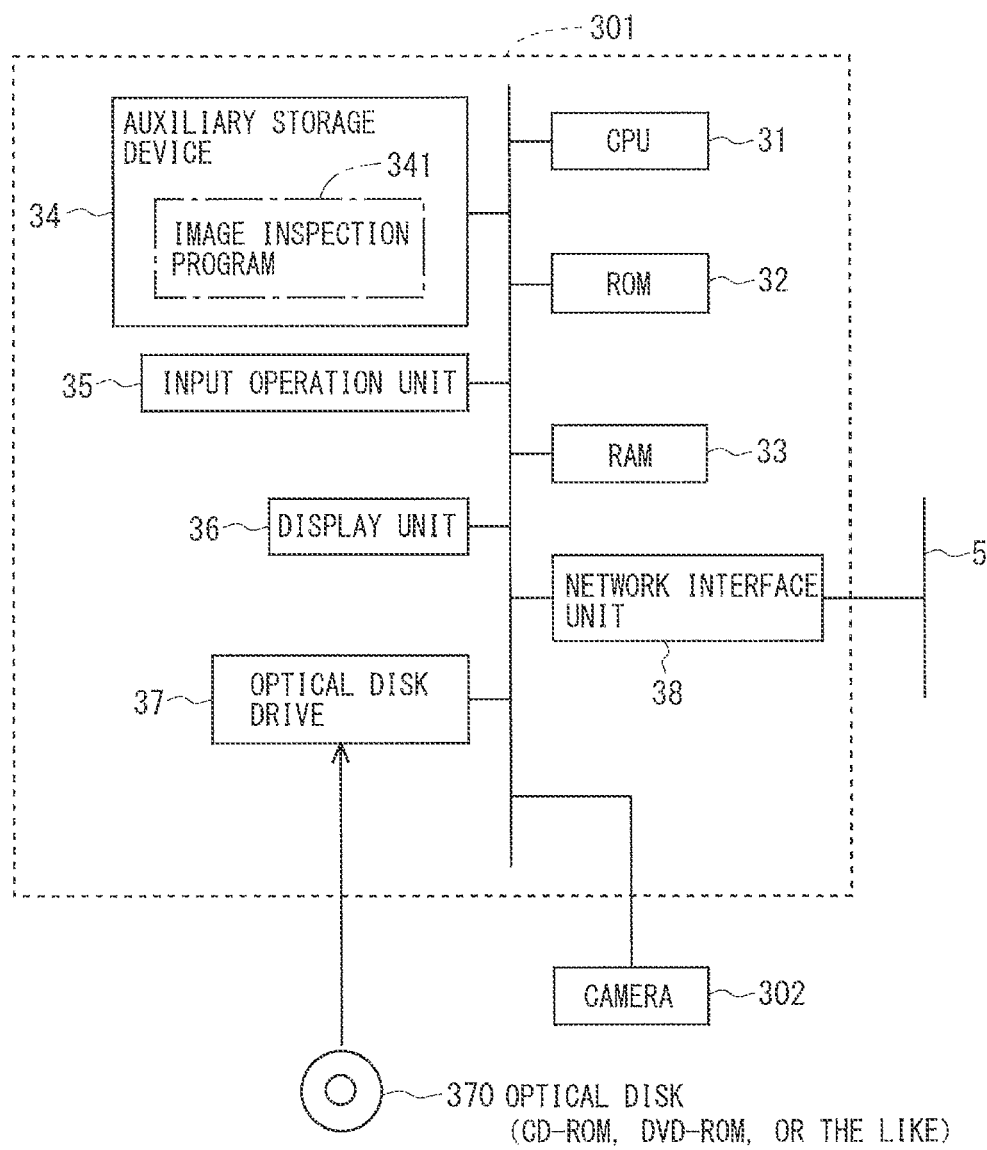
FIG. 3 is a hardware configuration diagram of an image inspection computer in the first embodiment.

FIG. 3 is a hardware configuration diagram of an image inspection computer 301 configuring the image inspection device 300. As shown in FIG. 3, the image inspection computer 301 includes a CPU 31, a ROM 32, a RAM 33, an auxiliary storage device 34, an input operation unit 35 such as a keyboard, a display unit 36, an optical disk drive 37, and a network interface unit 38. Moreover, the image inspection computer 301 is connected to the camera 302 provided inside the printer body 200. Data (for example, the print data Dp transmitted from the print data generation device 40) transmitted via the communication line 5 is inputted into the image inspection computer 301 via the network interface unit 38. The inspection result Dr obtained by the image inspection computer 301 is sent to the print control device 100 via the network interface unit 38 through the communication line 5. Note that it is also possible to adopt a configuration in which the image inspection computer 301 itself does not include the input operation unit 35 or the display unit 36, and data inputted by a user (worker) using an input operation unit or a display unit provided in the print control device 100 is sent to the image inspection computer 301.

The auxiliary storage device 34 stores an image inspection program 341. The image inspection program 341 is provided by being stored in a computer-readable recording medium (non-transitory recording medium) such as a CD-ROM or a DVD-ROM. That is, the user, for example, purchases an optical disk (CD-ROM, DVD-ROM, or the like) 370 as a recording medium of the image inspection program 341, inserts the optical disk 370 into the optical disk drive 37, reads the image inspection program 341 from the optical disk 370, and installs the image inspection program 341 in the auxiliary storage device 34. Alternatively, the image inspection program 341 transmitted via the communication line 5 may be received by the network interface unit 38 and installed in the auxiliary storage device 34. When the inspection of the print image is executed, the image inspection program 341 stored in the auxiliary storage device 34 is read into the RAM 33, and the CPU 31 executes the image inspection program 341 read into the RAM 33.

1.3.2 Functional Configuration

Figure 4:
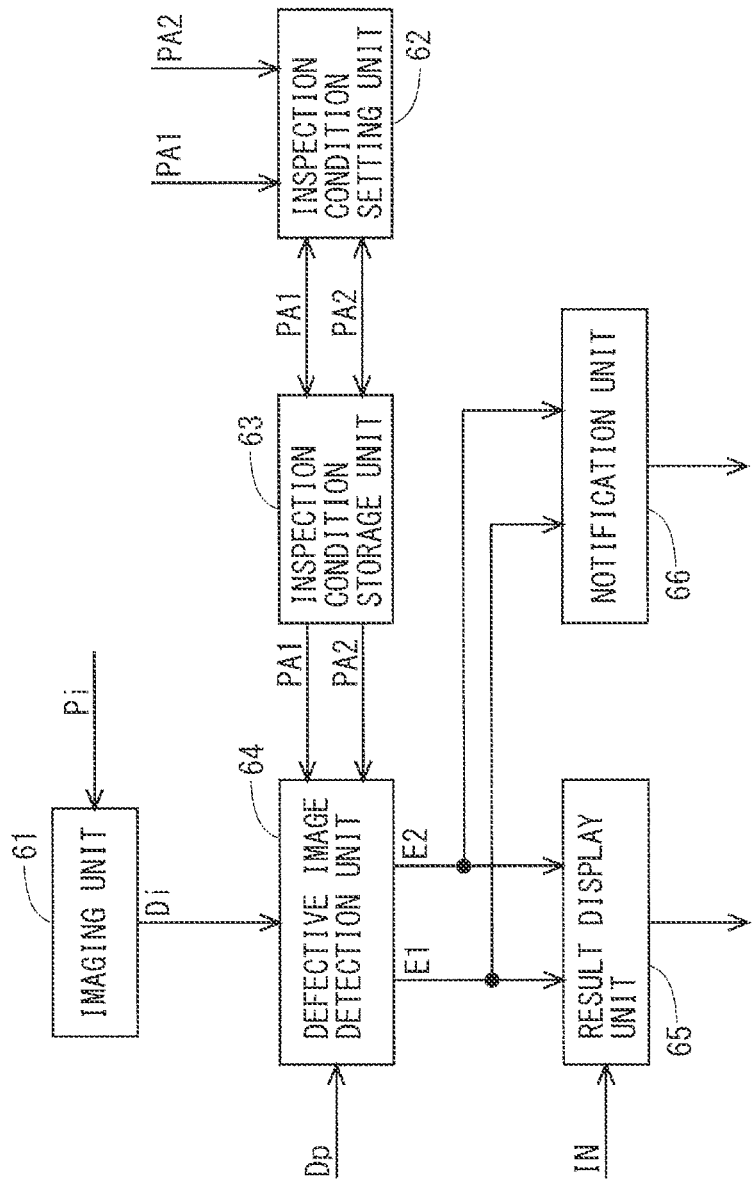
FIG. 4 is a block diagram showing a functional configuration of an image inspection device in the first embodiment.

FIG. 4 is a block diagram showing a functional configuration of the image inspection device 300 in the present embodiment. This image inspection device 300 functionally includes an imaging unit 61, an inspection condition setting unit 62, an inspection condition storage unit 63, a defective image detection unit 64, a result display unit 65, and a notification unit 66.

The imaging unit 61 is a component realized by the camera 302 as hardware, performs capturing a print image (image obtained by printing on the printing paper PA by the printing unit 24) Pi, and outputs the captured image data Di obtained by the capturing. Note that an imaging step is realized by this operation of the imaging unit 61.

Figure 5:
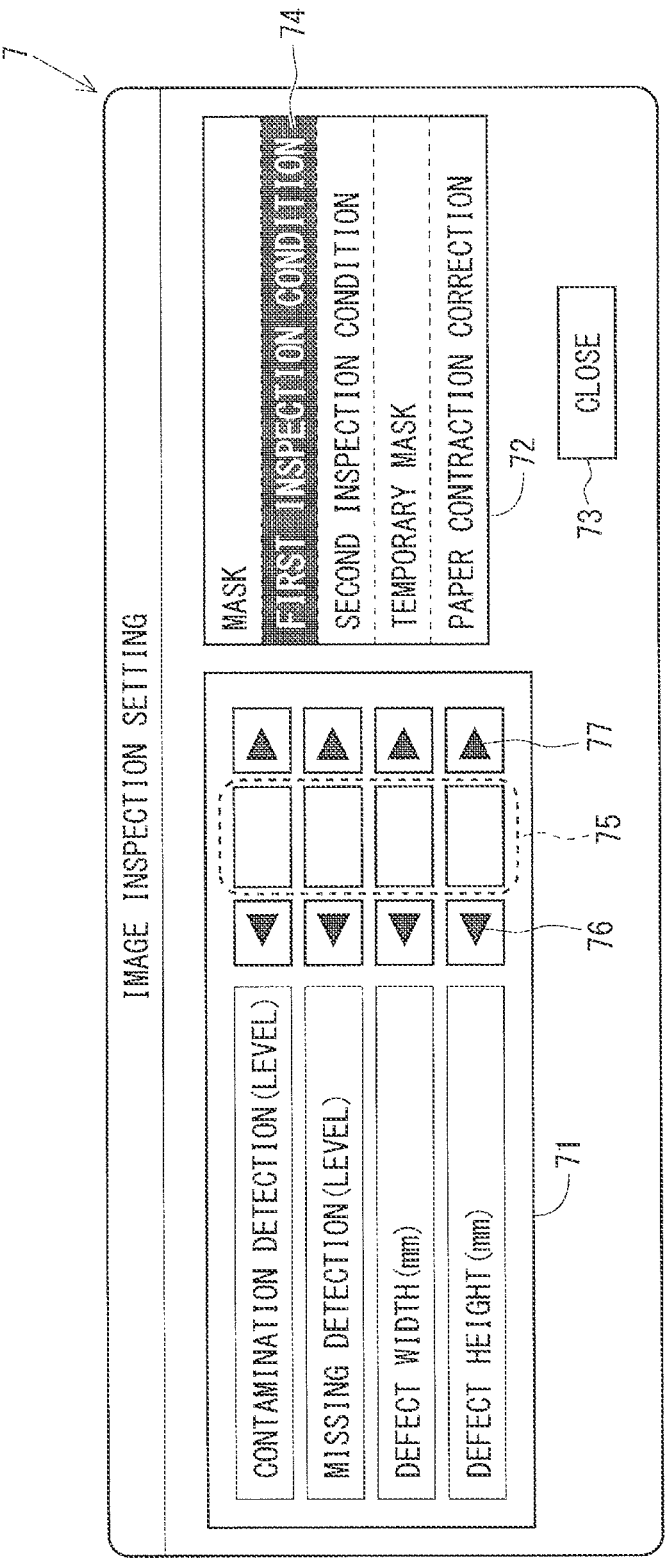
FIG. 5 is a diagram showing one example of an image inspection setting screen in the first embodiment.

The inspection condition setting unit 62 displays, on the display unit 36, a screen (hereinafter, referred to as an "image inspection setting screen") 7 for the user to set the inspection condition or the like that is a determination criterion when detecting a defect (defective image), and accepts an input by the user. FIG. 5 is a diagram showing one example of the image inspection setting screen 7. The image inspection setting screen 7 includes a setting value input area 71, a setting content list area 72, and a close button 73. In the setting value input area 71, a screen for the user to set (input) values of parameters corresponding to an item selected in the setting content list area 72 is displayed. In the setting content list area 72, a list of items that can be set by the user regarding the inspection is displayed. The user can select one of a plurality of items displayed in the setting content list area 72. The close button 73 is a button to be pressed when the user finishes the input on the image inspection setting screen 7. Note that an inspection condition setting step is realized by work in which the user sets the values of the parameters on the image inspection setting screen 7.

In the present embodiment, two inspection conditions (a first inspection condition and a second inspection condition) can be set on the image inspection setting screen 7. Accordingly, it is possible to perform inspection for detecting defects on the basis of each of the two inspection conditions. Note that in the present embodiment, it is assumed that the inspection based on the first inspection condition is treated as main inspection, and the inspection based on the second inspection condition is treated as sub-inspection. FIG. 5 shows the image inspection setting screen 7 when the first inspection condition is selected among a plurality of items (mask, first inspection condition, second inspection condition, temporary mask, and paper contraction correction) displayed in the setting content list area 72. As can be grasped from a portion denoted by reference sign 74 in FIG. 5, the first inspection condition among the plurality of items is highlighted. Since the first inspection condition is selected, a screen for the user to set (input) the values of the four parameters (contamination detection, missing detection, defect width, defect height) is displayed in the setting value input area 71. Also in a case in which the second inspection condition is selected, a similar screen is displayed in the setting value input area 71.

The setting value input area 71 when the first inspection condition or the second inspection condition is selected in the setting content list area 72 will be described in more detail (see FIG. 5). As described above, in this example, the user can set the values of the four parameters (contamination detection, missing detection, defect width, defect height). A field denoted by reference sign 75 (hereinafter, it is referred to as a "parameter value input field") is a field in which the user inputs the value of each of the parameters. Buttons 76 and buttons 77 are each a button for increasing or decreasing an input value (value inputted in the parameter value input field 75). When the button 76 is pressed by the user, the corresponding input value decreases by a predetermined value. When the button 77 is pressed by the user, the corresponding input value increases by a predetermined value. For example, when the button 76 corresponding to the input value for the defect width is pressed by the user, the input value decreases by 0.1, and when the button 77 corresponding to the input value for the defect width is pressed by the user, the input value increases by 0.1.

Figure 6:
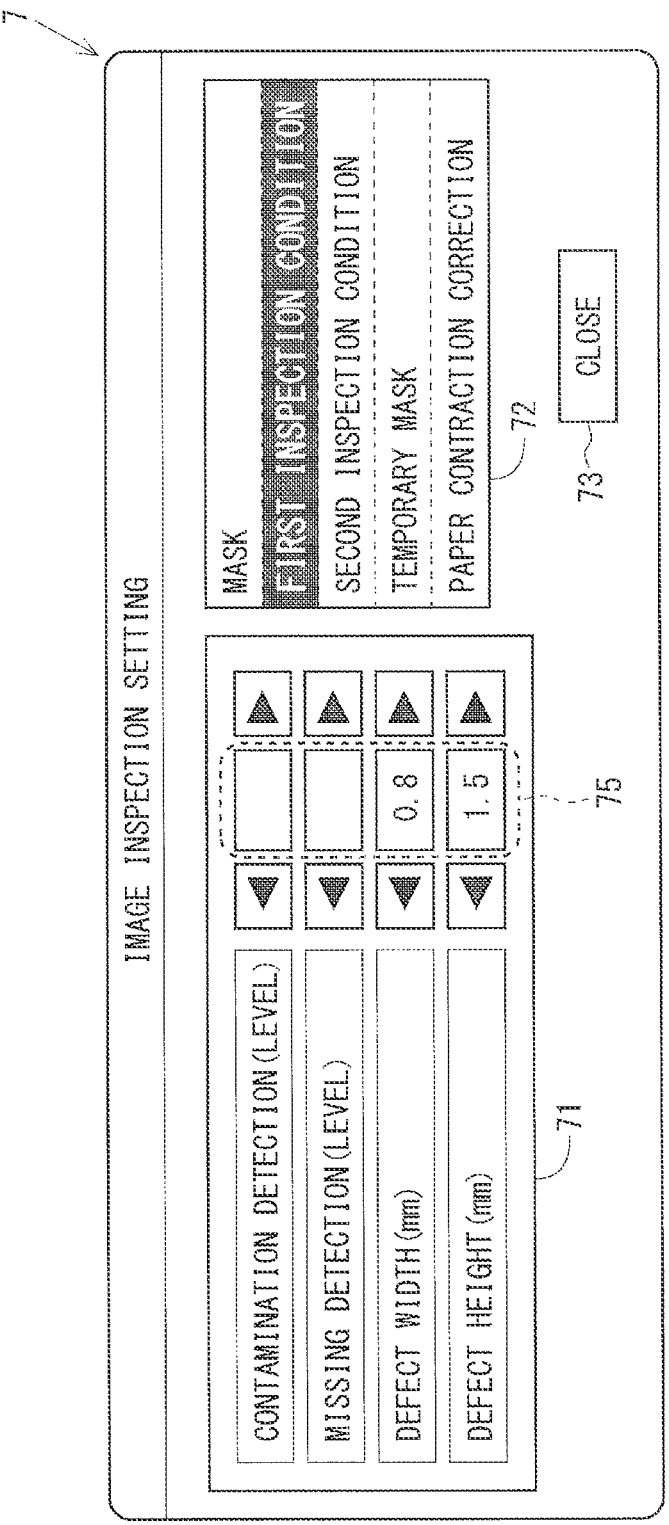
FIG. 6 is a diagram showing one input example of a first inspection condition in the first embodiment.
Figure 7:
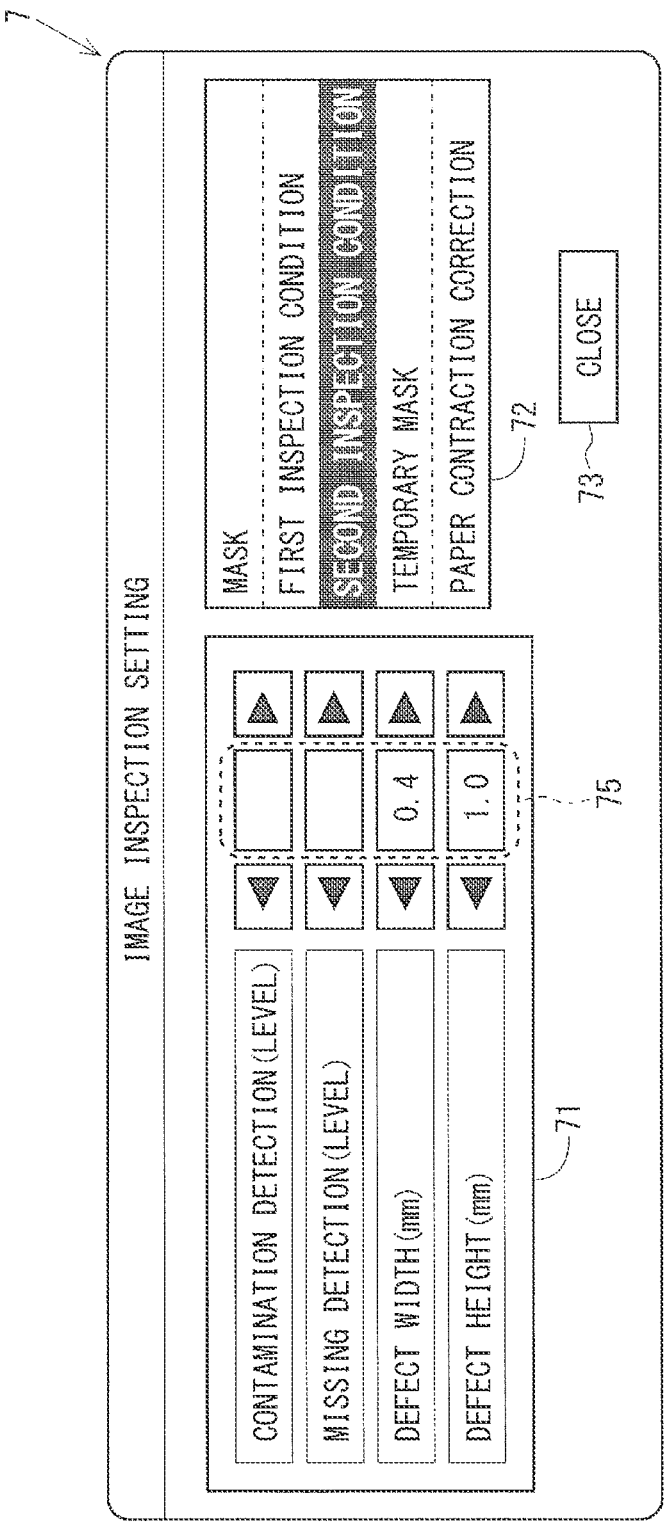
FIG. 7 is a diagram showing one input example of a second inspection condition in the first embodiment.

As above, in the present embodiment, the user can set the two inspection conditions (first inspection condition and second inspection condition), using the image inspection setting screen 7. FIG. 6 shows an input example of the first inspection condition, and FIG. 7 shows an input example of the second inspection condition. For the first inspection condition, the defect width is set to 0.8 mm, and the defect height is set to 1.5 mm. For the second inspection condition, the defect width is set to 0.4 mm, and the defect height is set to 1.0 mm. Hereinafter, the values of the parameters set as the first inspection condition are referred to as "first parameter values", and the values of the parameters set as the second inspection condition are referred to as "second parameter values". That is, in the present embodiment, the first parameter values and the second parameter values, which are two different determination criteria, are prepared as the inspection condition. Note that the first parameter values are denoted by reference sign PA1, and the second parameter values are denoted by reference sign PA2. Moreover, hereinafter, an inspection level corresponding to the first inspection condition (that is, inspection level corresponding to the first parameter values PA1) is referred to as a "first inspection level", and the inspection level corresponding to the second inspection condition (that is, the inspection level corresponding to the second parameter values PA2) is referred to as a "second inspection level".

When setting work of the inspection conditions (first inspection condition and second inspection condition) by the user using the image inspection setting screen 7 is completed, the first parameter values PA1 and the second parameter values PA2 are stored in the inspection condition storage unit 63. In other words, the inspection condition setting unit 62 accepts an input of the first parameter values PA1 and the second parameter values PA2 by the user, and stores the accepted first parameter values PA1 and second parameter values PA2 in the inspection condition storage unit 63. When the inspection condition setting unit 62 displays the image inspection setting screen 7 on the display unit 36 in a state where the setting of the inspection condition (the setting of the first parameter values PA1 and the second parameter values PA2) has already been performed (that is, when the inspection condition is reset), the first parameter values PA1 and the second parameter values PA2 stored in the inspection condition storage unit 63 are read. When the first inspection condition in the setting content list area 72 is selected, the read first parameter values PA1 are displayed in the parameter value input field 75, and when the second inspection condition in the setting content list area 72 is selected, the read second parameter values PA2 are displayed in the parameter value input field 75.

The defective image detection unit 64 detects a defective image from the captured images on the basis of the inspection condition stored in the inspection condition storage unit 63. In this regard, the defective image is detected, for example, by performing image analysis based on the captured image data Di or comparison and collation between the captured image data Di and the print data Dp transmitted from the print data generation device 40. Moreover, as processing of detecting the defective image, processing based on the first parameter values PA1 (hereinafter, it is referred to as "first detection processing") and processing based on the second parameter values PA2 (hereinafter, it is referred to as "second detection processing") are performed. That is, the defective image detection unit 64 performs the first detection processing of detecting a defective image from the captured images on the basis of the first parameter values PA1 stored in the inspection condition storage unit 63 and the second detection processing of detecting a defective image from the captured images on the basis of the second parameter values PA2 stored in the inspection condition storage unit 63. As above, the defective image detection unit 64 performs the inspection (main inspection) based on the first inspection condition and the inspection (sub-inspection) based on the second inspection condition. Hereinafter, an image detected as a defective image by the first detection processing is referred to as a "first detected image", and an image detected as a defective image by the second detection processing is referred to as a "second detected image". The first detected image is denoted by reference sign E1, and the second detected image is denoted by reference sign E2. Note that a defective image detecting step is realized by this operation of the defective image detection unit 64.

The result display unit 65 displays an inspection result screen on the display unit 36 in response to a selection input IN by the user. Note that the selection input IN is an input (input by the user) for selecting whether a display target of the inspection result is a result of the main inspection or a result of the sub-inspection.

Figure 8:
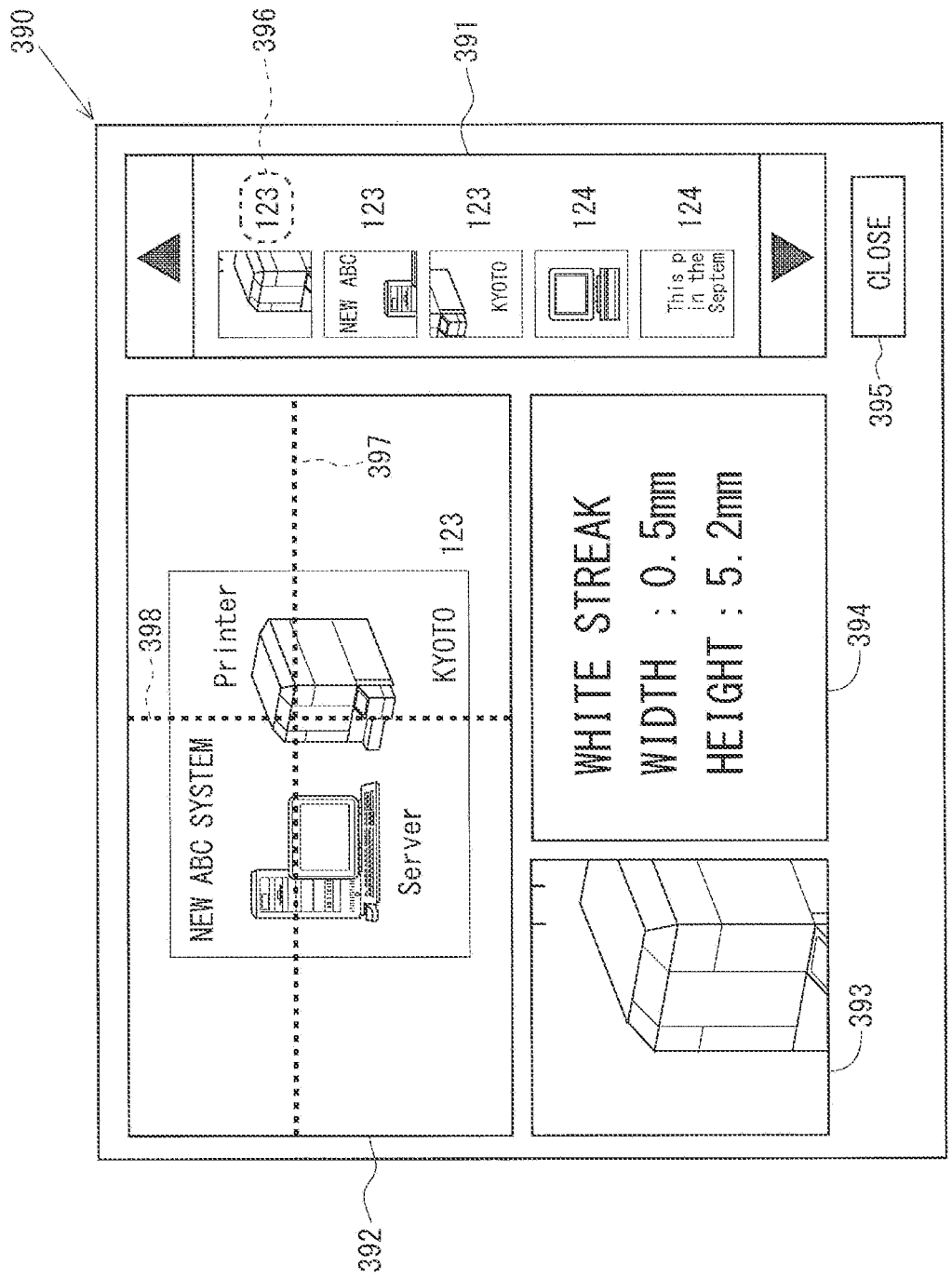
FIG. 8 is a diagram showing one example of an inspection result screen displayed by a result display unit in the first embodiment.

FIG. 8 is a diagram showing an example of an inspection result screen 390 displayed by the result display unit 65. As shown in FIG. 8, the inspection result screen 390 includes a thumbnail area 391, a sheet display area 392, an enlarged display area 393, a defect content display area 394, and a close button 395. In the thumbnail area 391, a list of defective images as the first detected images E1 or a list of defective images as the second detected images E2 is displayed in a thumbnail format in response to the selection input IN by the user. Note that a portion denoted by reference sign 396 displays sheet numbers for specifying a sheet including the corresponding defective image. The user can select one of defective images displayed in the thumbnail area 391. In the sheet display area 392, an image representing the entire sheet including the defective image selected by the user is displayed. In the example shown in FIG. 8, the corresponding defective image exists at a position where a horizontal line 397 and a vertical line 398 intersect. That is, a position of the defective image is indicated by the horizontal line 397 and the vertical line 398. An enlarged image of the defective image is displayed in the enlarged display area 393. In the defect content display area 394, a content of the defect is displayed by characters. The close button 395 is a button to be pressed when the user makes this inspection result screen 390 non-displayed. The user can check whether or not the defect detected by the inspection is an acceptable defect by referring to this inspection result screen 390.

Figure 9:
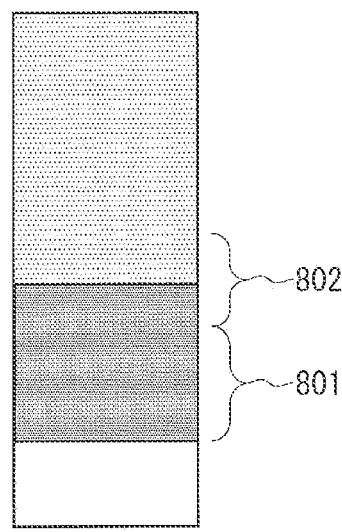
FIG. 9 is a diagram for describing notification by a notification unit in the first embodiment.

The notification unit 66 performs notification related to the detection of the defect in accordance with the defective image (first detected images E1, second detected images E2) detected by the defective image detection unit 64 during the processing of the defective image detection unit 64 or after the end of the processing of the defective image detection unit 64. Hereinafter, one example of the notification performed by the notification unit 66 will be described. The notification by the notification unit 66 is performed by displaying a message on the display unit 36. Moreover, the notification of different contents is performed between the main inspection and the sub-inspection. For example, for the first detected images E1 detected in the main inspection, notification that the sheet including the defective image is processed as spoilage is performed, and for the second detected images E2 detected in the sub-inspection, information of the defective image is notified as reference information. In this example, it is assumed that an inspection range of the main inspection is a range denoted by reference sign 801 in FIG. 9, and an inspection range of the sub-inspection is a range denoted by reference sign 802 in FIG. 9. In this case, a notification indicating that defects corresponding to the range denoted by reference sign 801 among the defects each having a high fatal degree are processed as spoilage is performed, and information on the defects corresponding to the range denoted by reference sign 802 among the defects each having a high fatal degree, and defects corresponding to the range denoted by reference sign 802 among the defects each having a low fatal degree is notified as the reference information. Note that for the defect notified as the reference information, the user determines whether or not to process as spoilage, for example, by visual observation. Since the notification unit 66 as described above is provided, for example, it is possible to call attention to the user when a defect is detected, and occurrence of a printing accident caused by overlooking of the defect is suppressed.

In the foregoing, the example in which the notification by the notification unit 66 is performed by displaying a message on the display unit 36 has been described. However, the present invention is not limited thereto. As the notification by the notification unit 66, instead of displaying the message on the display unit 36 or in addition to displaying the message on the display unit 36, sounding of a tower lamp provided in the inkjet printing device 10 or the image inspection device 300 (that is, notification by voice) may be performed, or notification to an external device (external device that executes a pre-process or a post-process of a printing process performed by the inkjet printing device 10) such as a post-processing machine may be performed. In this regard, for example, operation of the tower lamp can be controlled such that the tower lamp sounds when a defect is detected in the main inspection, but the tower lamp does not sound when a defect is detected in the sub-inspection. Moreover, for example, operation of the post-processing machine can be controlled such that when a defect is detected in the main inspection, the sheet including the defect is discarded by the post-processing machine, but even when the defect is detected in the sub-inspection, the sheet including the defect is not discarded by the post-processing machine.

1.4 Inspection Result

Next, an inspection result obtained by the processing of the defective image detection unit 64 will be described. As described above, in the present embodiment, it is possible to perform the inspection for detecting a defect on the basis of each of the two inspection conditions (first inspection condition and second inspection condition). In this regard, the user can set the second inspection level higher than the first inspection level, or can set the second inspection level lower than the first inspection level. The images (first detected images E1) detected as the defective images in the main inspection are the same for the case where the second inspection level is higher than the first inspection level and the case where the second inspection level is lower than the first inspection level. Particularly, regardless of whether the second inspection level is higher or lower than the first inspection level, in the main inspection, all the images determined to be the defective images when the determination criterion (criterion for determining whether or not an inspection target image is the defective image) is the first inspection level are detected as the defective images. In contrast, the images (second detected images E2) detected as the defective images in the sub-inspection are different between in the case where the second inspection level is higher than the first inspection level and in the case where the second inspection level is lower than the first inspection level. This will be described below.

Figure 10:
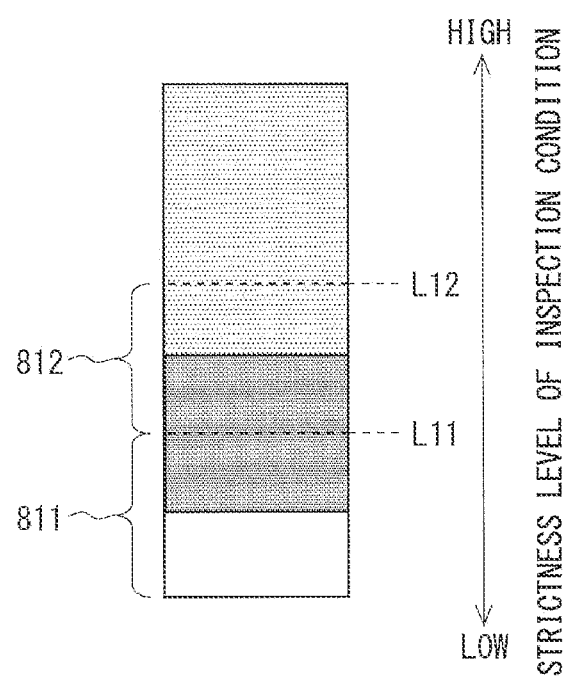
FIG. 10 is a diagram for describing images detected as defective images in sub-inspection when a second inspection level is higher than a first inspection level in the first embodiment.

FIG. 10 is a diagram for describing the case where the second inspection level is higher than the first inspection level. In FIG. 10, L11 represents the first inspection level, and L12 represents the second inspection level. In this case, a range denoted by reference sign 811 is the inspection range at the time of the main inspection, and a range denoted by reference sign 812 is the inspection range at the time of the sub-inspection. Accordingly, images obtained by excluding images determined to be the defective images when the determination criterion is the first inspection level from images determined to be the defective images when the determination criterion is the second inspection level are detected as defective images in the sub-inspection.

Figure 11:
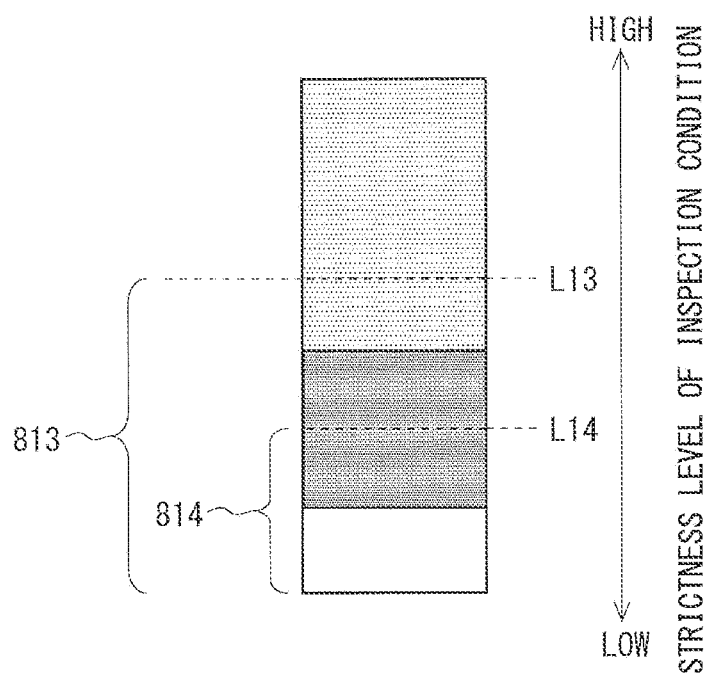
FIG. 11 is a diagram for describing images detected as defective images in the sub-inspection when the second inspection level is lower than the first inspection level in the first embodiment.

FIG. 11 is a diagram for describing the case where the second inspection level is lower than the first inspection level. In FIG. 11, L13 represents the first inspection level, and L14 represents the second inspection level. In this case, a range denoted by reference sign 813 is the inspection range at the time of the main inspection, and a range denoted by reference sign 814 is the inspection range at the time of the sub-inspection. Accordingly, all the images determined to be the defective images when the determination criterion is the second inspection level are detected as the defective images in the sub-inspection. Meanwhile, in this case, as can be grasped from FIG. 11, all the images detected as the defective images in the sub-inspection are also detected as the defective images in the main inspection.

1.5 Operation Examples

Next, operation examples of the inspection in the present embodiment will be described.

1.5.1 First Example

Figure 12:
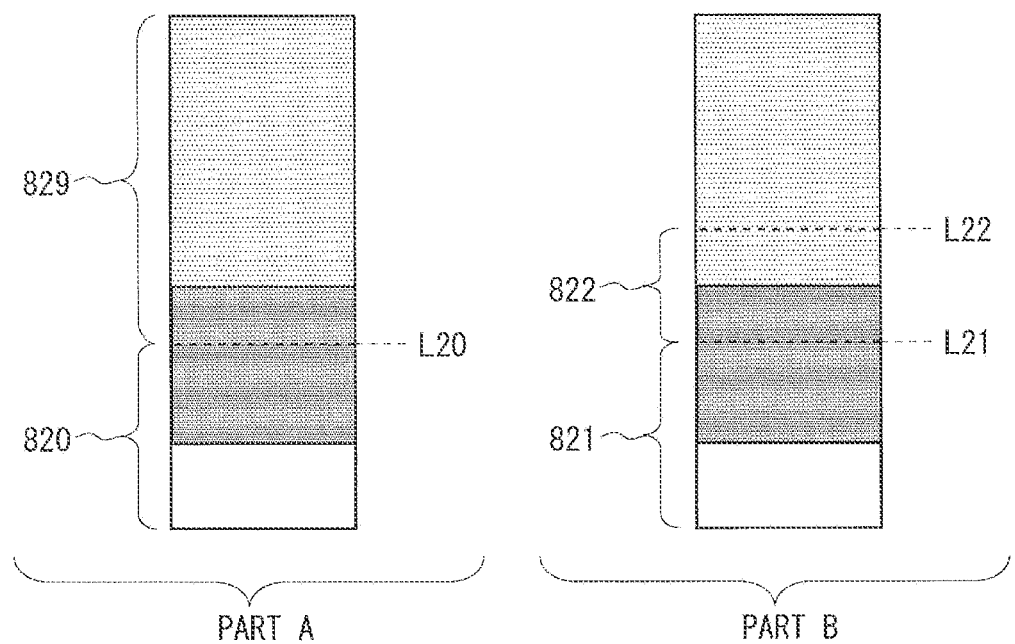
FIG. 12 is a diagram for describing a first example of an operation example of inspection in the first embodiment.

In a case where the inspection level is L20 in the part A of FIG. 12 in the conventional image inspection device, while defects corresponding to a range denoted by reference sign 820 are detected by the inspection, defects corresponding to a range denoted by reference sign 829 are not detected by the inspection. That is, a part of defects each having a high fatal degree are not detected by the inspection.

Figure 13:
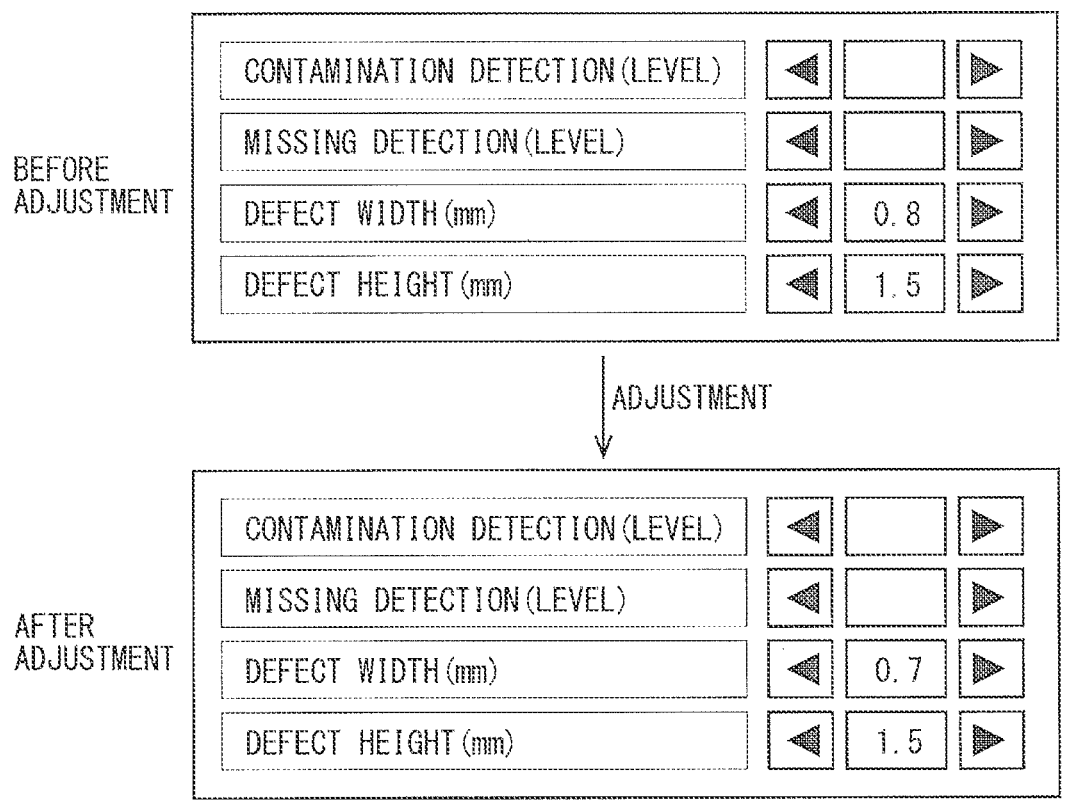
FIG. 13 is a diagram for describing an example of adjustment of first parameter values in the first embodiment.
Figure 14:
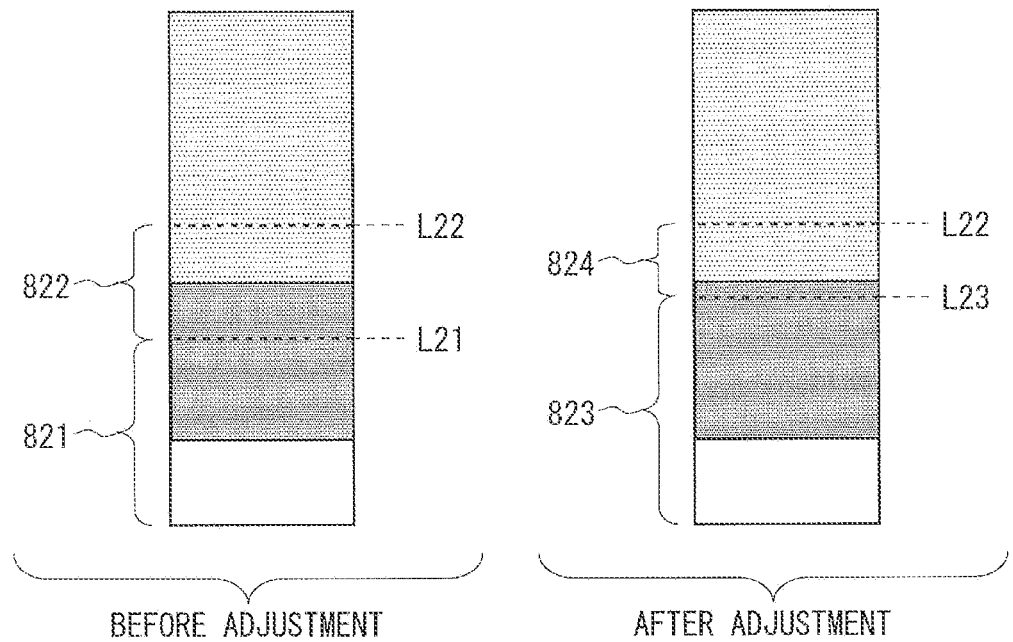
FIG. 14 is a diagram for describing change of the first inspection level by the adjustment of the first parameter values in the first embodiment.

Therefore, in the first example, the second inspection level is set to a level higher than the first inspection level so as to obtain an inspection result in a case where the inspection condition is made stricter with reference to the main inspection. For example, setting of the inspection condition (setting of the first parameter values PA1 and the second parameter values PA2) is performed such that the first inspection level is L21 in the part B of FIG. 12 and the second inspection level is L22 in the part B of FIG. 12. Consequently, defects corresponding to a range denoted by reference sign 821 are detected in the main inspection, and in addition, defects corresponding to a range denoted by reference sign 822 are detected in the sub-inspection. This allows the user to grasp the defects additionally detected in the case where it is assumed that the inspection condition of the main inspection is made stricter, and to determine the validity of the result of the main inspection. The user adjusts the first parameter values PA1, for example, as shown in FIG. 13 with reference to the result of the sub-inspection (here, it is assumed that the second parameter values PA2 are maintained). As a result, for example, as shown in FIG. 14, the first inspection level that is L21 before the adjustment becomes L23 after the adjustment. Note that the second inspection level is maintained at L22. In the example shown in FIG. 14, after the adjustment of the first parameter values PA1, defects corresponding to a range denoted by reference sign 823 are detected by the main inspection. That is, most of the defects each having a high fatal degree are detected by the main inspection. In this way, by suitably adjusting the first parameter values PA1, the result of the main inspection can be brought close to an ideal inspection result. More particularly, by adjusting the first parameter values PA1 as needed while continuing operation of the inspection by the image inspection device 300, the result of the main inspection can be gradually brought closer to the ideal inspection result.

1.5.2 Second Example

Figure 15:
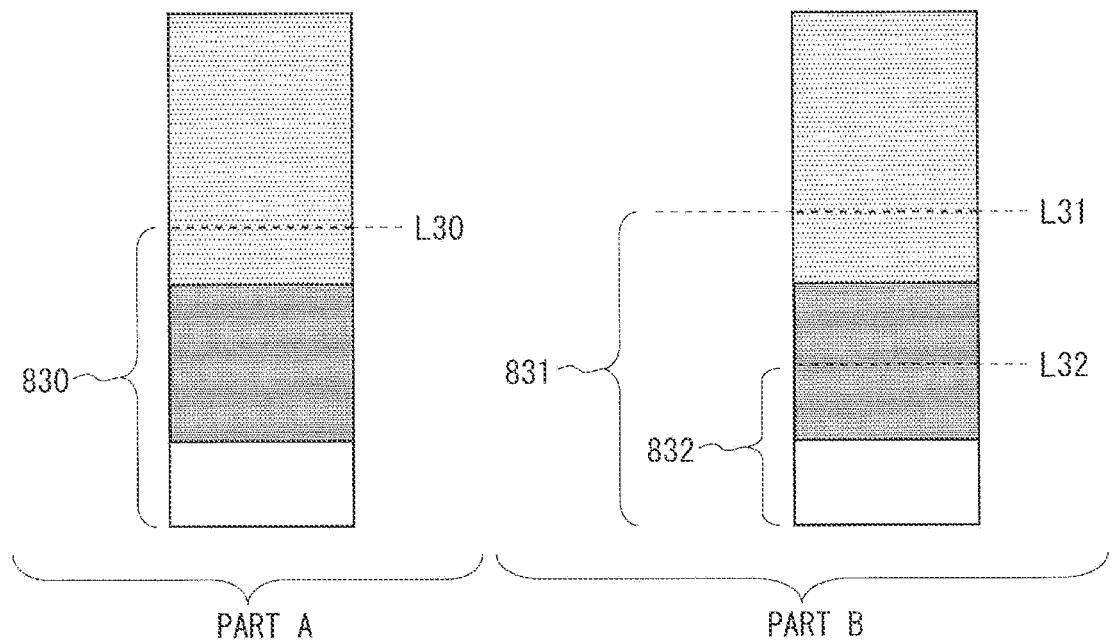
FIG. 15 is a diagram for describing a second example of the operation example of the inspection in the first embodiment.

In the case where the inspection level is L30 in the part A of FIG. 15 in the conventional image inspection device, defects corresponding to a range denoted by reference sign 830 are detected by the inspection. Here, when operation of automatically discarding a sheet including a defect as spoilage is adopted, a sheet including a defect having a low fatal degree is also automatically discarded.

Therefore, in a second example, the second inspection level is set to a level lower than the first inspection level so as to obtain an inspection result in a case where the inspection condition is loosen with reference to the main inspection. For example, setting of the inspection condition (setting of the first parameter values PA1 and the second parameter values PA2) is performed such that the first inspection level is L31 in the part B of FIG. 15 and the second inspection level is L32 in the part B of FIG. 15. Consequently, defects corresponding to a range denoted by reference sign 831 are detected in the main inspection, and in addition, defects corresponding to a range denoted by reference sign 832 are detected in the sub-inspection. This allows the user to grasp the inspection result in the case where it is assumed that the inspection condition of the main inspection is loosened, and to determine the validity of the result of the main inspection. As in the first example, by adjusting the first parameter values PA1 as needed while continuing the operation of the inspection by the image inspection device 300, the result of the main inspection can be gradually brought closer to the ideal inspection result.

1.6 Effects

According to the present embodiment, the user can set the two inspection conditions (first parameter values PA1 and second parameter values PA2) regarding the inspection for detecting the defective image included in the print image. The defective image detection unit 64 performs the first detection processing of detecting a defective image on the basis of the first parameter values PA1 and the second detection processing of detecting a defective image on the basis of the second parameter values PA2. This makes it possible to obtain the results of the inspection under the two different inspection conditions. Therefore, for example, the validity of the result of the main inspection can be determined, and the inspection condition can be easily adjusted. In view of the foregoing, regarding an image inspection device that inspects a print image, a user can easily set a suitable inspection condition.

2. Second Embodiment

A second embodiment of the present invention will be described. Hereinafter, differences from the first embodiment will be mainly described.

2.1 Overview

In the first embodiment, after the inspection results (result of the main inspection and result of the sub inspection) on the basis of each of the two inspection conditions are obtained, for example, in order to bring the result of the main inspection close to the ideal inspection result, the user needs to adjust the inspection condition with reference to the result of the sub-inspection. At that time, the user needs to visually confirm whether or not the defects presented as the result of the sub-inspection are acceptable, and a cost for the confirmation work is required. Moreover, since detected defects differ depending on a print content, the first parameter values PA1 cannot be necessarily set to suitable values by operation for a short period of time. Therefore, in the present embodiment, instead of presenting all the images detected by the defective image detection unit 64 as defective images, processing of narrowing down (extracting) images to be presented as defective images from the images detected by the defective image detection unit 64 (hereinafter, it is referred to as "filter processing") is performed using technology of artificial intelligence (AI).

Images detected as the defective images by the defective image detection unit 64 includes an image that cannot actually be accepted as a final product (hereinafter, such a state of the image is referred to as a "truly faulty" for convenience) and an image that can actually be accepted as a final product (hereinafter, such a state of the image is referred to as a "falsely faulty" for convenience). Note that, hereinafter, a truly faulty image is simply referred to as a "faulty image", and each of a falsely faulty image and an image that is not detected as a defective image by the defective image detection unit 64 is referred to as a "good image". In the filter processing, it is discriminated whether an image detected as a defective image by the defective image detection unit 64 is a good image or a faulty image. Then, only a faulty image is finally presented as a defective image.

2.2 Configuration of Image Inspection Device

2.2.1 Hardware Configuration of Image Inspection Computer

Figure 16:
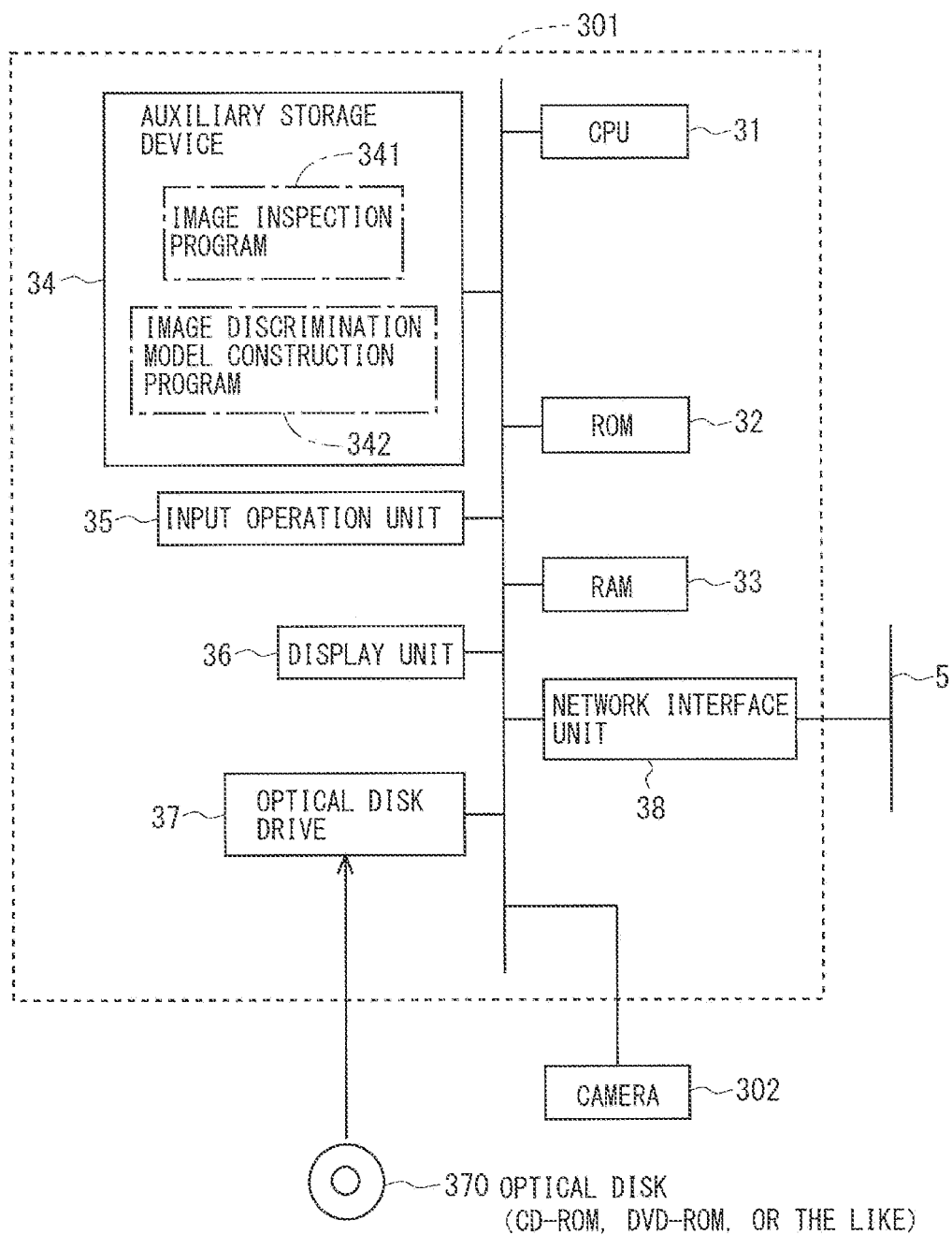
FIG. 16 is a hardware configuration diagram of an image inspection computer in a second embodiment of the present invention.

FIG. 16 is a hardware configuration diagram of the image inspection computer 301 in the present embodiment. In the present embodiment, an image discrimination model construction program 342 for constructing an image discrimination model for discriminating whether an image detected as a defective image by the first and second detection processing described above is a good image or a faulty image is stored in the auxiliary storage device 34. The other points are similar to those of the first embodiment.

2.2.2 Functional Configuration

Figure 17:
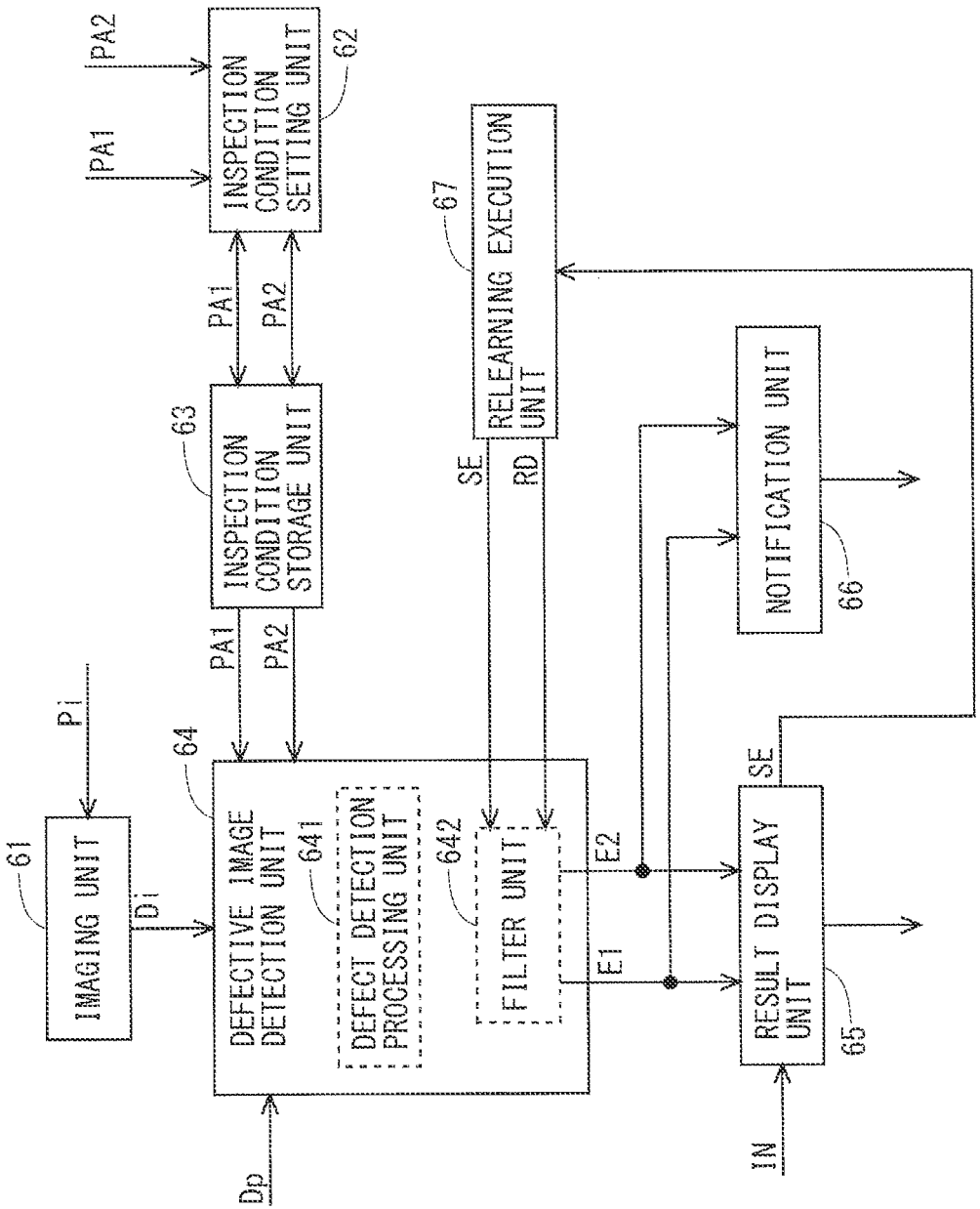
FIG. 17 is a block diagram showing a functional configuration of an image inspection device in the second embodiment.

FIG. 17 is a block diagram showing a functional configuration of the image inspection device 300 in the present embodiment. In the present embodiment, as shown in FIG. 17, the defective image detection unit 64 includes a defect detection processing unit 641 and a filter unit 642. The defect detection processing unit 641 performs the first detection processing and the second detection processing. The filter unit 642 performs the above-described filter processing. Particularly, the filter unit 642 extracts an image to be finally presented as a defective image from images detected as defective images by the defect detection processing unit 641. In order to extract the image to be finally presented as the defective image, the filter unit 642 includes the above-described image discrimination model. The image discrimination model discriminates whether each of the images detected as the defective images by the defect detection processing unit 641 is a good image or a faulty image. The image determined to be a faulty image is finally treated as a defective image. Therefore, in the present embodiment, an image determined to be a faulty image by the image discrimination model among the images detected as defective images in the first detection processing is the first detected image E1, and an image determined to be a faulty image by the image discrimination model among the images detected as defective images in the second detection processing is the second detected image E2. The image discrimination model will be described in detail later. Note that hereinafter, for convenience of description, images detected as defective images by the first detection processing and the second detection processing are each referred to as a "defect candidate image".

Moreover, the image inspection device 300 in the present embodiment is provided with a relearning execution unit 67 in addition to the components (see FIG. 4) provided in the first embodiment. The image discrimination model included in the filter unit 642 is a learnt artificial intelligence model as described later, and the relearning execution unit 67 causes the image discrimination model to execute relearning. Note that the relearning will be described later in detail.

Components other than the "defective image detection unit 64 and the relearning execution unit 67" are similar to those in the first embodiment.

2.3 Image Discrimination Model

2.3.1 Overview

As described above, the filter unit 642 (see FIG. 17) includes the image discrimination model for discriminating whether each of the defect candidate images is a good image or a faulty image. The defect candidate image determined to be a faulty image by the image discrimination model is finally treated as a defective image. Learning with the image discrimination model is performed using teacher data corresponding to faulty images and teacher data corresponding to good images. Hereinafter, for convenience of description, the teacher data corresponding to faulty images is referred to as "first teacher data", and teacher data corresponding to good images is referred to as "second teacher data".

Since occurrence frequency of printing faults such as ink contamination and a white streak is generally low in the inkjet printing device, it is difficult to secure a sufficient number of pieces of learning data as the first teacher data. Therefore, in the present embodiment, pseudo fault data representing ink contamination, a white streak, or the like is prepared, and a large number of pieces of first teacher data are created by combining the pseudo fault data in various modes with the captured image data obtained by capturing a print image that is a good image. Note that as the pseudo defect data, high-density pseudo fault data and low-density pseudo fault data are prepared. For example, the pseudo fault data representing ink contamination corresponds to the high-density pseudo fault data, and the pseudo fault data representing a white streak corresponds to the low-density pseudo fault data.

Moreover, in the present embodiment, not only data corresponding to a discrimination target image (defect candidate image detected by the first detection processing or the second detection processing) is given but also data corresponding to an original image of the discrimination target image is given to the image discrimination model as input data so that a faulty portion (defective portion) in the image is focused on in discrimination with the image discrimination model. Note that in the present specification, the term "discrimination target image" is used not only for the image given to the image discrimination model at the time of discrimination but also for the image given to the image discrimination model at the time of learning.

2.3.2 Overall Processing Procedure for Constructing Image Discrimination Model In order to realize the filter processing by the filter unit 642, the image discrimination model needs to be constructed in advance. Therefore, an overall processing procedure for constructing the image discrimination model will be described with reference to FIG. 18.

First, print data for executing printing in the inkjet printing device 10 is prepared (step S10). In step S10, for example, the print data generation device 40 performs RIP processing on submitted data such as a PDF file or the like to generate the print data that is data in a bitmap format.

Figure 19:
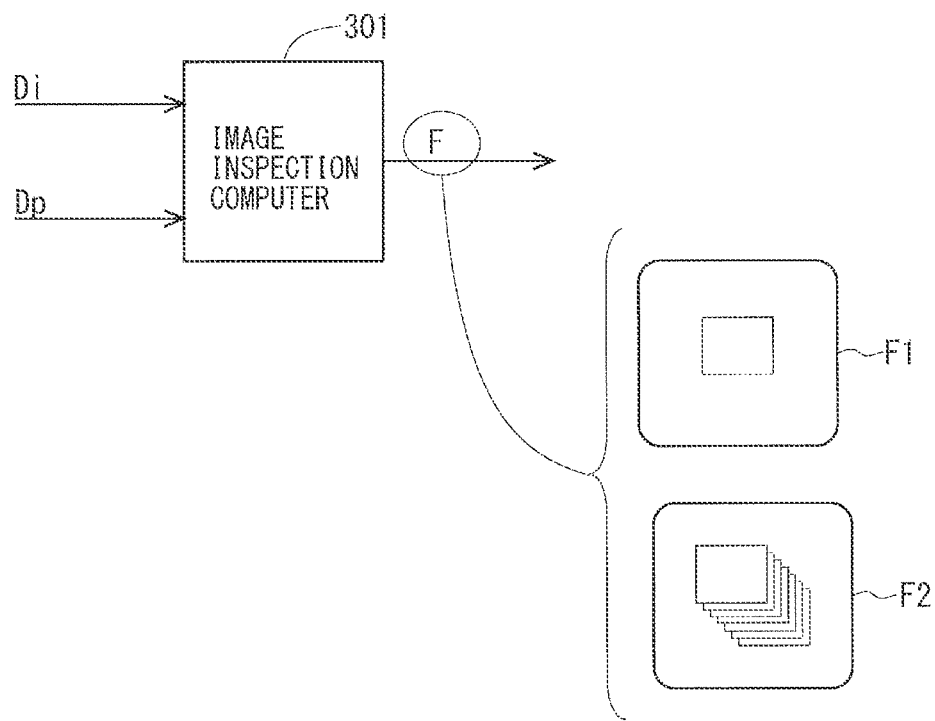
FIG. 19 is a diagram for describing comparison and collation between captured image data and print data in the second embodiment.

Next, print output is executed by the inkjet printing device 10 based on the print data prepared in step S10 (step S20). Inspection based on a predetermined inspection condition by the image inspection device 300 is performed on the print image that is a result of the print output (steps S30 and S40). In step S30, the camera (imaging device) 302 included in the image inspection device 300 captures (reads) the print image. As a result, the captured image data Di that is RGB format data is obtained. In step S40, as shown in FIG. 19, in the image inspection computer 301, the captured image data Di is compared and collated with the print data Dp after conversion from the CMYK format to the RGB format (hereinafter, the print data in the CMYK format and the print data obtained by converting the print data in the CMYK to data in the RGB format are collectively referred to as "original image data"), and fault information F is obtained as an inspection result. This fault information F includes data (true fault data) F1 of an image that is truly faulty and data (false fault data) F2 of an image that is falsely faulty. The fault information F and the original image data are sent from the image inspection device 300 to the print data generation device 40 as necessary.

The processing in steps S10 to S40 is typically performed on a plurality of pieces of print data. That is, the fault information F based on a large number of print images is obtained by repeating the processing of steps S10 to S40.

After the fault information F is obtained, combined image data to be data of a combination destination of the pseudo fault data in step S70 described later is collected (step S50). In step S50, the data of the print image that has not been determined to be a printing fault (defective image) in the inspection by the image inspection device 300 and the false fault data F2 included in the fault information F are collected as the combined image data. Whether the data included in the fault information F is the true fault data F1 or the false fault data F2 is discriminate by visual observation. Note that the data collected as the combined image data is image data in a partial range of the entire print image (entire page).

Next, the pseudo fault data is collected on the basis of the true fault data F1 included in the above-described fault information F (step S60). The collection of the pseudo fault data is performed, for example, by extracting only an ink contamination portion from the image of the true fault data F1, using image editing software in the image inspection computer 301, the print data generation device 40, or the like. A color of the contamination in an extracted portion is a mixture of a color of ink causing the contamination and a color of a background (original image). The image that is a source of the true fault data F1 is the print image outputted from the inkjet printing device 10. That is, in the present embodiment, the pseudo fault data (contamination data) representing the ink contamination is image data extracted from the print image outputted from the inkjet printing device 10 in the past. Note that image data randomly generated using a figure generating means (program for automatically generating a figure, or the like) may be used as the pseudo fault data.

Thereafter, processing (model construction processing) of constructing the image discrimination model, using the combined image data collected in step S50, the pseudo fault data collected in step S60, and the like is performed (step S70). Details of step S70 will be described later.

2.3.3 Structure of Image Discrimination Model

Before describing the model construction processing (step S70 in FIG. 18) in detail, a structure of the image discrimination model will be described. Note that the structure described here is an example, and the present invention is not limited thereto.

Figure 20:
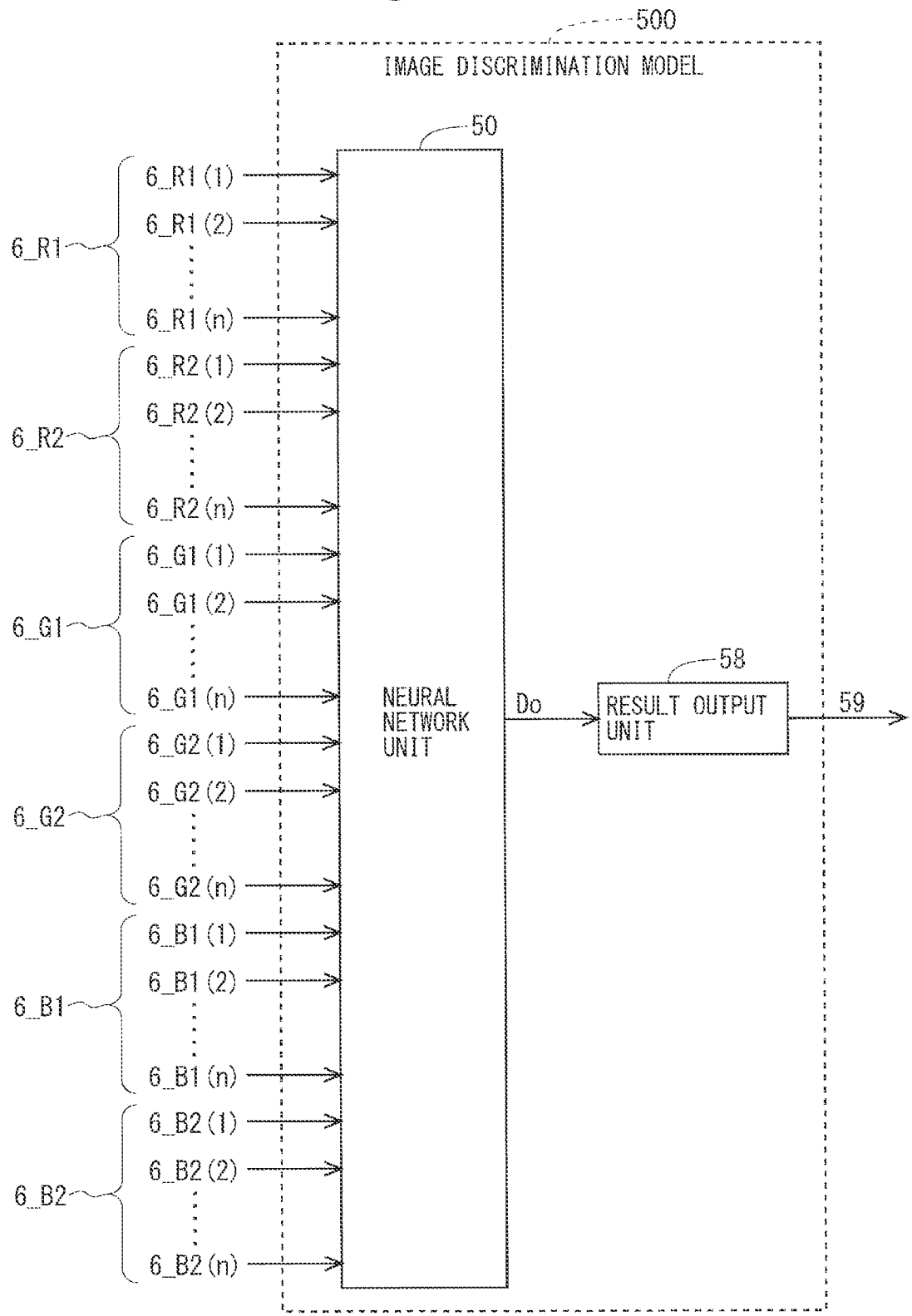
FIG. 20 is a schematic configuration diagram of the image discrimination model in the second embodiment.

FIG. 20 is a schematic configuration diagram of an image discrimination model 500. As shown in FIG. 20, the image discrimination model 500 includes a neural network unit 50 that performs machine learning, and a result output unit 58 that outputs a discrimination result 59 as to whether the discrimination target image is a good image or a faulty image. In the present embodiment, the neural network unit 50 is realized by a convolutional neural network.

To the neural network unit 50, "data in which the captured image data and the original image data are combined" or "data in which data obtained by combining the pseudo fault data with the captured image data, and the original image data are combined" is given as input data. Note that, hereinafter, the "captured image data" and the "data obtained by combining the pseudo fault data with the captured image data" are collectively referred to as "captured base data". The input data is RGB format data, and input data of each color is configured of the captured base data and the original image data. Therefore, in detail, as shown in FIG. 20, red captured base data 6_R1, red original image data 6_R2, green captured base data 6_G1, green original image data 6_G2, blue captured base data 6_B1, and blue original image data 6_B2 are given as the input data to the neural network unit 50.

As above, data of the six channels is inputted to the neural network unit 50. The data of each of the channels is configured of n (n is plural) pieces of pixel value data. For example, the red captured base data 6_R1 is configured of n pieces of pixel value data 6_R1(1) to 6_R1(n) as shown in FIG. 20. From the above, (6×n) pieces of pixel value data are inputted to the neural network unit 50.

Figure 21:
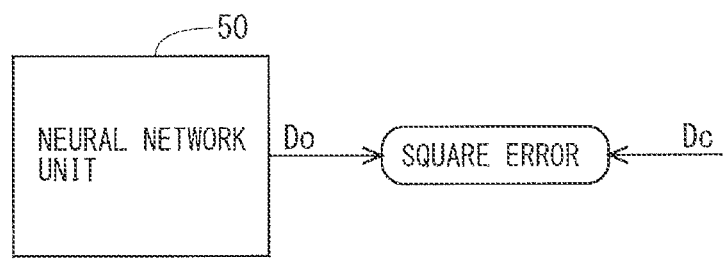
FIG. 21 is a diagram for describing processing at the time of learning in the second embodiment.

The neural network unit 50 outputs discrimination data Do for discriminating whether the image of the captured base data is a good image or a faulty image. The discrimination data Do is numerical data of 0 or more and 1 or less. At the time of learning, values of parameters used in the neural network unit 50 (convolutional neural network) are updated by a backpropagation process based on a difference (typically, square error) (see FIG. 21) between a value of the discrimination data Do and a value of correct answer data Dc (for example, the value of the correct answer data corresponding to a faulty image is set to 1, and the value of the correct answer data corresponding to a good image is set to 0). At the time of discrimination, for example, if the value of the discrimination data Do is 0.5 or more, the discrimination result 59 indicating that the discrimination target image is a faulty image is outputted from the result output unit 58, and if the value of the discrimination data Do is less than 0.5, the discrimination result 59 indicating that the discrimination target image is a good image is outputted from the result output unit 58.

Figure 22:
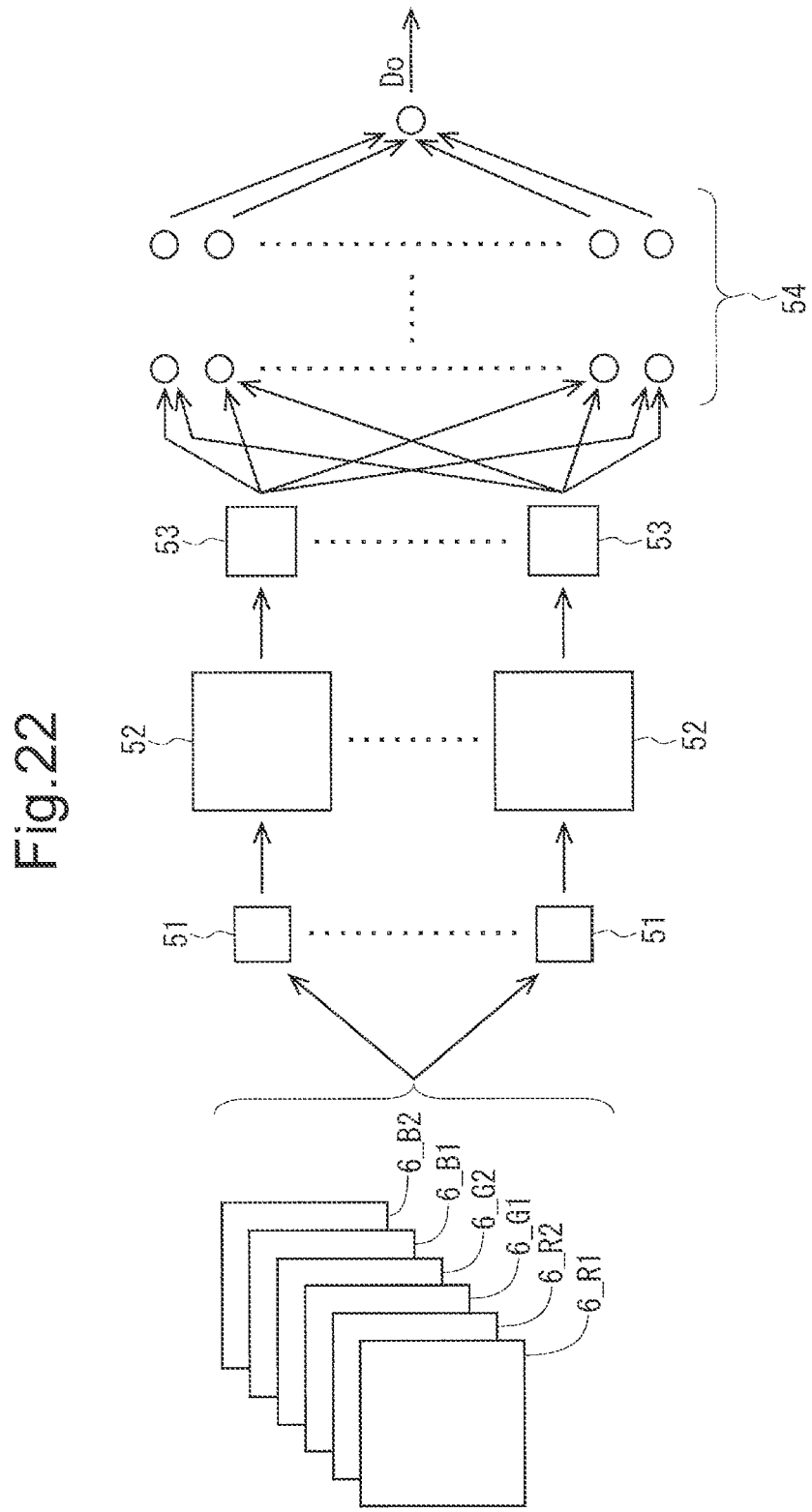
FIG. 22 is a diagram showing one example of a detailed configuration of a neural network unit in the image discrimination model in the second embodiment.

FIG. 22 is a diagram showing one example of a detailed configuration of the neural network unit 50 in the image discrimination model 500. When the above-described data of the six channels (red captured base data 6_R1, red original image data 6_R2, green captured base data 6_G1, green original image data 6_G2, blue captured base data 6_B1, and blue original image data 6_B2) is inputted to the neural network unit 50, a convolution operation based on one or a plurality of sets of convolution filters 51 is performed on the input data. Note that each of the sets of convolution filters 51 includes six filters, and one feature map 52 is obtained by the convolution operation based on each of the sets of convolution filters 51. For example, in a case where three sets of convolution filters 51 are used, three feature maps 52 are obtained by the convolution operation. Then, a pooling operation is performed on each of the feature maps 52, by which pooling data 53 with reduced dimensions is obtained. The pooling data 53 obtained in this manner is given to fully connected layer 54, and the above-described discrimination data Do is outputted from the fully connected layer 54. On the basis of the value of the discrimination data Do, the parameters are updated at the time of learning, and the discrimination result 59 for the discrimination target image is outputted at the time of discrimination, as described above. Then, as the discrimination result 59, an image finally determined to be a faulty image is displayed on the result display unit 65. Note that, when an image determined to be a faulty image is displayed on the result display unit 65, a faulty image and a good image can be in different display forms. Specifically, the image determined to be a faulty image may be displayed in front of the image determined to be a good image. Moreover, the image determined to be a faulty image may be marked and displayed, and the image determined to be a good image may be displayed in a different display manner, which allows the user to easily distinguish the faulty image. Alternatively, by displaying only the image determined to be a faulty image on the result display unit 65 without displaying the image determined to be a good image on the result display unit 65, the faulty image and the good image can be displayed in different display forms. By adopting such a display form with respect to the result display unit 65, a number of images that need to be visually confirmed by the user after end of the inspection is reduced, so that a burden on the user is reduced. Further, according to this, the user can suitably set the inspection condition.

2.3.4 Model Construction Processing

Figure 23:
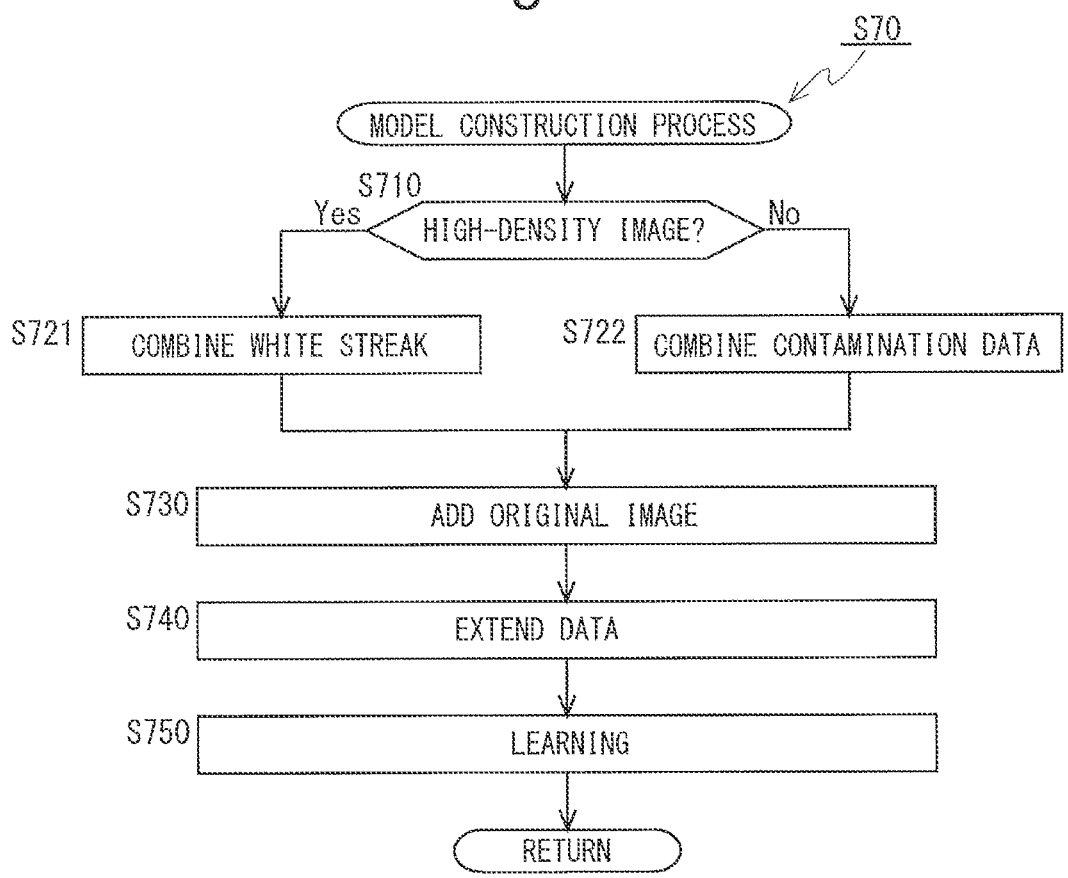
FIG. 23 is a flowchart showing a procedure of model construction processing in the second embodiment.

Next, referring to a flowchart shown in FIG. 23, a procedure of the model construction processing (step S70 in FIG. 18) will be described. The processing described here is performed by the image inspection computer 301 executing the image discrimination model construction program 342. However, for example, this processing may be performed by the print data generation device 40.

As described above, in the present embodiment, processing of creating the teacher data (first teacher data) corresponding to a faulty image is performed. This processing is performed by combining the pseudo fault data with the captured image data as the combined image data. In this regard, the first teacher data is desirably data close to a faulty image (defective image) to be actually detected by the image inspection device 300. For example, a portion where ink contamination adheres to a background on which ink is applied thinly or a portion where ink missing occurs in a background on which ink is applied thickly should be detected as a faulty image (defective image).

Therefore, in order to differ the pseudo fault data to be combined with the captured image data in accordance with a density of ink in the background, first, it is determined whether a partial image (discrimination target image) with which the pseudo fault data is combined in the print image used for learning is a high-density image or a low-density image (step S710). In step S710, whether the discrimination target image is a high-density image or a low-density image is determined on the basis of the captured image data corresponding to the discrimination target image. However, this determination may be made on the basis of the original image data corresponding to the discrimination target image. Since the captured image data is the RGB format data, an average value of pixel values configuring the captured image data is obtained for each of the colors of RGB. That is, three average values (average value for red, average value for green, and average value for blue) are obtained. Then, each of the three average values is compared with a predetermined threshold value, and whether the discrimination target image is a high-density image or a low-density image is determined, depending on whether a predetermined condition is satisfied.

If it is determined in step S710 that the discrimination target image is a high-density image, the processing proceeds to step S721. On the other hand, if it is determined in step S710 that the discrimination target image is a low-density image, the processing proceeds to step S722.

Figure 24:
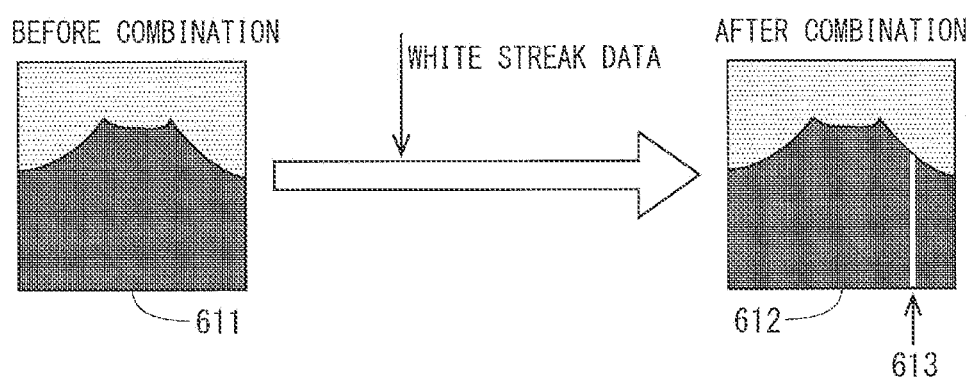
FIG. 24 is a diagram for describing combination of white streak data with the captured image data in the second embodiment.

In step S721, the first teacher data is created by combining white streak data as the pseudo fault data with the captured image data. In step S721, for example, as shown in FIG. 24, the white streak data is combined with captured image data 611, and first teacher data 612 including white streak data 613 is created.

Figure 25:
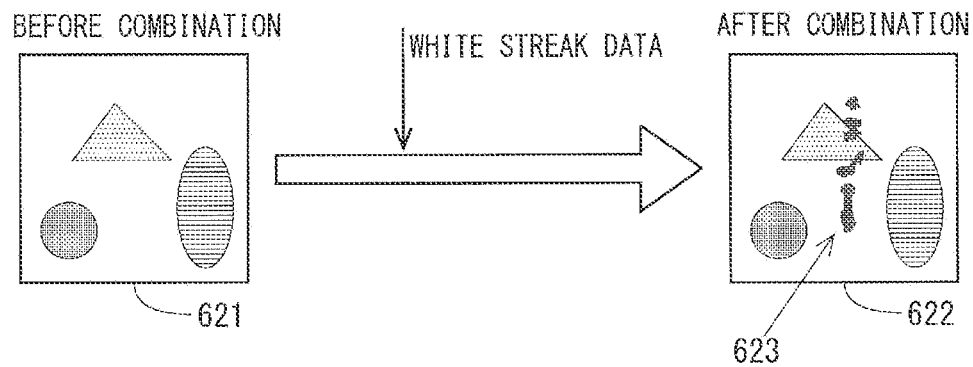
FIG. 25 is a diagram for describing combination of contamination data with the captured image data in the second embodiment.

In step S722, the first teacher data is created by combining the contamination data as the pseudo fault data with the captured image data. The contamination data is prepared in advance in step S60 in FIG. 18. In step S722, for example, as shown in FIG. 25, the contamination data is combined with captured image data 621, and first teacher data 622 including contamination data 623 is created.

A print image that is a creation source of the first teacher data is selected by the user. On the basis of the selected print image, the processing of steps S710, S721, and S722 is performed without an operation of the user. That is, the first teacher data is automatically created.

In step S730, processing of adding the original image data to the teacher data (first teacher data and second teacher data) to be used for learning in step S750 described later is performed. A reason why such processing is performed is that, as described above, a faulty portion (defective portion) in the image is focused on at the time of discrimination by the image discrimination model 500.

Next, processing called data extension is performed on the teacher data (step S740). Particularly, a number of pieces of the teacher data is increased by performing conversion processing such as inversion, enlargement, and reduction on the image of the teacher data existing at the start time of step S740. Note that while the processing in step S740 is not necessarily required, an effect of improving robustness can be obtained by increasing the number of pieces of teacher data in this manner.

Figure 18:
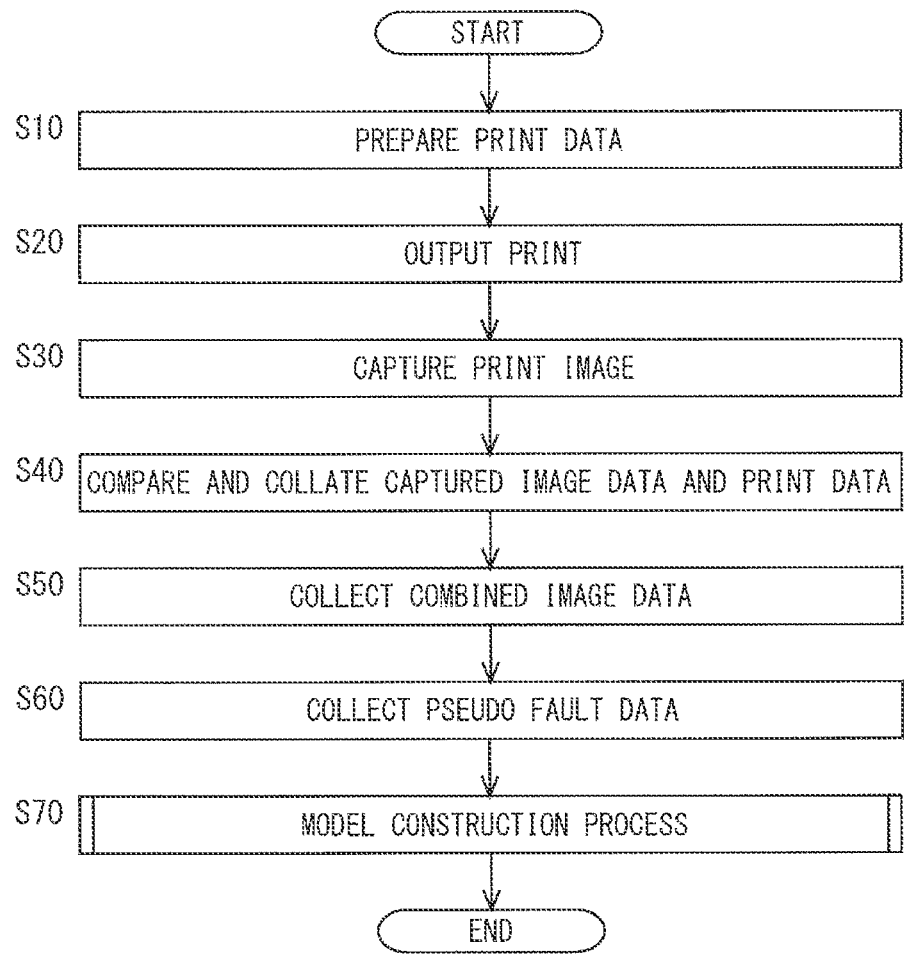
FIG. 18 is a flowchart showing an overall processing procedure of constructing an image discrimination model in the second embodiment.

Typically, the processing of steps S710 to S740 is repeated a number of times equal to a number of pieces of the combined image data collected in step S50 in FIG. 18. As a result, a large number of first teacher data to be used for learning are created.

Thereafter, learning (machine learning) is performed by sequentially giving the teacher data (first teacher data and second teacher data) to the neural network unit 50 (step S750). As a result, the parameters of the neural network unit 50 are optimized, and the image discrimination model 500 is constructed.

2.3.5 Addition of Original Image Data to Teacher Data

Next, processing of adding the original image data to the teacher data (first teacher data and second teacher data) (processing in step S730 in FIG. 23) will be described in detail.

In a case where ink contamination occurs on a plurality of sheets of paper when the data printed by the inkjet printing device 10 is variable data, the background usually differs for each of the sheets of paper. Moreover, shapes and colors of the ink contamination are various. In view of the above, even if the artificial intelligence model is caused to learn images, the learning may not be performed focusing on the ink contamination. For example, there is a case where a specific design in the background is focused on, and a state of the image is determined to be a true fault although it is not a true fault. According to the conventional method, in this manner, the background greatly affects a learning result, so that discrimination between ink contamination or a white streak that is truly faulty, and an image that is not truly faulty is not accurately performed.

Figure 26:
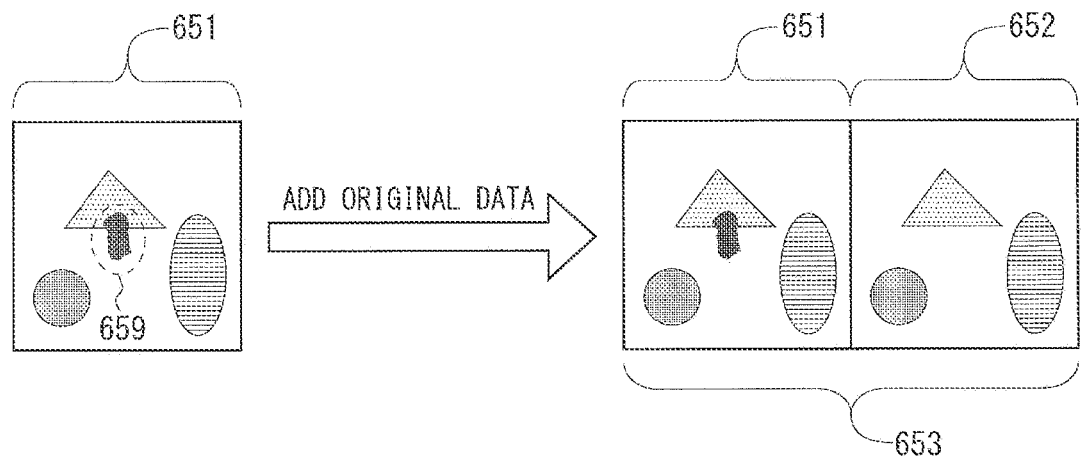
FIG. 26 is a diagram for describing addition of original image data to teacher data in the second embodiment.

Therefore, in the present embodiment, not only the data corresponding to the discrimination target image but also the data corresponding to the original image data of the discrimination target image is given to the image discrimination model 500 as the input data so that the image discrimination model 500 performs the discrimination, focusing on the faulty portion (defective portion) in the image. That is, prior to learning, the processing of adding the original image to the discrimination target image is performed. This processing is performed for both the first teacher data and the second teacher data. In the present embodiment, the first teacher data is created by combining the pseudo fault data with the captured image data. Therefore, as shown in FIG. 26, the addition of the original image data to the first teacher data is performed by adding original image data 652 to the captured base data 651 that is data obtained by combining pseudo fault data 659 with the captured image data. In this way, input data 653 to the image discrimination model 500 is obtained. Note that the addition of the original image data to the second teacher data is performed by adding the original image data to the captured base data that is the captured image data itself. In this way, the background is prevented from affecting the learning result.

Figure 27:
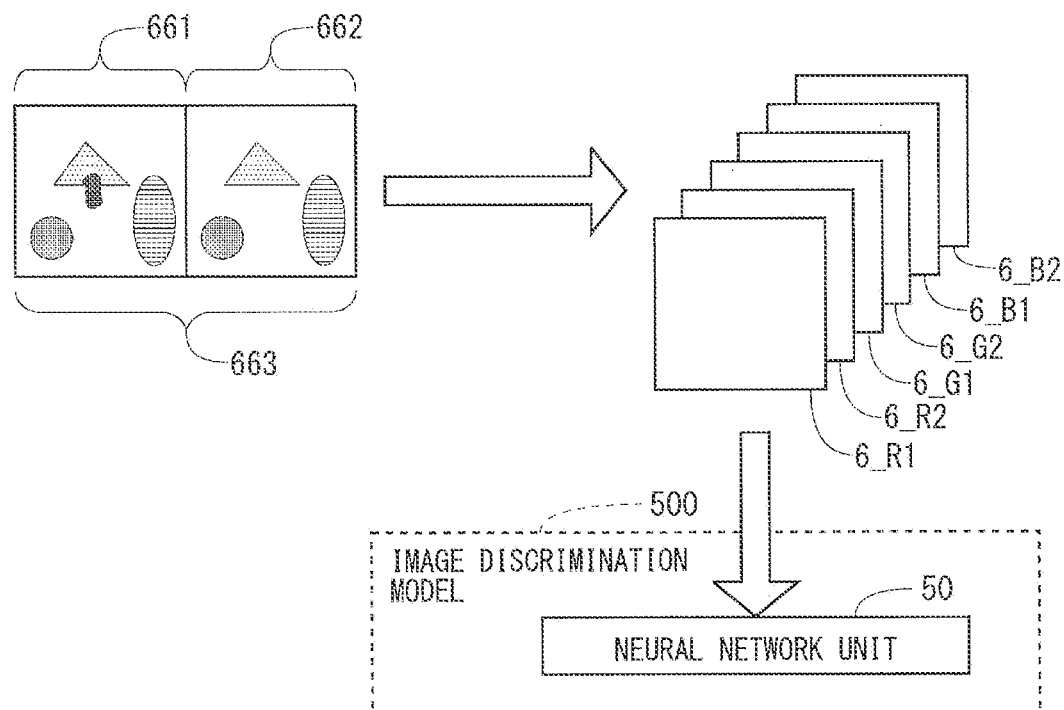
FIG. 27 is a diagram for describing input data (input data to the image discrimination model) in which the original image data is added to imaging base data in the second embodiment.

Input data 663 obtained by adding original image data 662 to captured base data 661 is provided to the neural network unit 50 in the image discrimination model 500 as the data of six channels configured of the red captured base data 6_R1, the red original image data 6_R2, the green captured base data 6_G1, the green original image data 6_G2, the blue captured base data 6_B1, and the blue original image data 6_B2, as shown in FIG. 27.

By thus adding, to the teacher data, the original image data corresponding to the print image to be actually obtained, learning (learning in the image discrimination model 500) is performed while focusing on a difference between the discrimination target image and the original image.

2.3.6 Regarding Relearning

According to this image inspection device 300, the results of the inspection based on the respective two inspection conditions are obtained (that is, the result of the main inspection and the result of the sub-inspection are obtained). However, for example, regarding a defect presented as the result of the sub-inspection, whether or not the defect is acceptable is visually confirmed. Moreover, depending on the operation, regarding a defect presented as the result of the main inspection, whether or not the defect is acceptable is also visually confirmed. In the present embodiment, a relearning execution unit 67 is provided in the image inspection device 300 so that relearning of the image discrimination model 500 is enabled on the basis of the result obtained by the above-described visual confirmation (see FIG. 17).

In the image inspection device 300 according to the present embodiment, in order to cause the image discrimination model 500 that is an artificial intelligence model to execute relearning, the user can select a defective image displayed on the inspection result screen 390 and input a determination result RD indicating whether a selected defective image SE is a good image or a faulty image. Then, the defective image SE selected by the user and the determination result RD are given to the image discrimination model 500 included in the filter unit 642.

More particularly, at the time of relearning, data obtained by combining the data of the defective image selected by the user and the original image data corresponding thereto is given as the input data to the neural network unit 50 configuring the image discrimination model 500. Thus, the discrimination data Do is outputted from the neural network unit 50. Moreover, a value corresponding to the determination result RD obtained by visual confirmation is given to the image discrimination model 500 as the correct answer data Dc. The values of the parameters used in the neural network unit 50 are updated by the backpropagation process based on the difference (typically, square error) between the value of the discrimination data Do and the value of the correct answer data Dc. Note that, as the value corresponding to the determination result RD, for example, 1 is adopted when it is determined that the relevant defective image is a faulty image, and 0 is adopted when it is determined that the relevant defective image is a good image.

2.4 Effects

According to the present embodiment, the filter unit 642 including the image discrimination model 500 that is an artificial intelligence model performs filter processing of narrowing down the image to be finally presented as the defective image from the images detected by the defect detection processing unit 641. As a result, since the number of images that need to be visually confirmed by the user after the end of the inspection of the print images is reduced as compared with that in the first embodiment, a burden on the user is reduced. Moreover, since the filter processing of narrowing down the image to be finally presented as the defective image from the images detected by the defect detection processing unit 641 is performed, it is easy to suitably adjust the first parameter values PA1. Furthermore, by performing relearning of the image discrimination model 500, it is possible to bring the result of the main inspection closer to the ideal inspection result with a smaller number of times of operation.

Note that, for example, the first parameter values PA1 may be automatically adjusted by the image inspection program 341 using the data given to the image discrimination model 500 for relearning.

3. Modifications

Hereinafter, modifications will be described.

3.1 First Modification

In the second embodiment, for both the image detected as the defective image by the first detection processing and the image detected as the defective image by the second detection processing, filtering by the filter unit 642 (that is, filtering using the image discrimination model 500 that is an artificial intelligence model) is performed. However, regarding the determination by the artificial intelligence model, a risk of erroneous determination increases particularly in a case where learning is insufficient. Moreover, since the result obtained by using the artificial intelligence model cannot be theoretically described, there are many users who do not like to adopt the discrimination by the artificial intelligence model.

Therefore, in the present modification, the filter unit 642 (see FIG. 17) does not perform filtering on the image detected as the defective image by the first detection processing, and performs filtering only on the image detected as the defective image by the second detection processing. Therefore, in the present modification, all the images detected as the defective images in the first detection processing are the first detected images E1, and the images determined to be the faulty images by the image discrimination model 500 among the images detected as the defective images in the second detection processing are the second detected images E2.

According to the present modification, since the filtering using the artificial intelligence model is not performed for the result of the main inspection, occurrence of a printing accident caused by erroneous determination of the artificial intelligence model is suppressed. Moreover, by adjusting the first parameter values PA1 as needed while continuing the operation of the inspection by the image inspection device 300, an inspection range in which the discrimination by the artificial intelligence model is performed can be narrowed. By adjusting the first parameter values PA1 as needed in this manner, it is possible to suppress the occurrence of a printing accident caused by erroneous determination of the artificial intelligence model.

Note that similar to the second embodiment, also in the present modification, by performing relearning of the image discrimination model 500, it is possible to bring the result of the main inspection closer to the ideal inspection result with a smaller number of times of operation.

3.2 Second Modification

In each of the above embodiments, it is assumed that the notification unit 66 makes a certain notification in accordance with the detection result of the defective image by the defective image detection unit 64. However, even when a similar defect is detected, a notification content desired by the user is different. Moreover, some users may wish to be notified of different contents depending on contents of the work. Further, other users may wish to be notified of the result of the sub-inspection with a content similar to the result of the main inspection. Therefore, in the present modification, the image inspection device 300 is provided with a function of enabling the user to select a content notified by the notification unit 66 from a plurality of levels.

Figure 28:
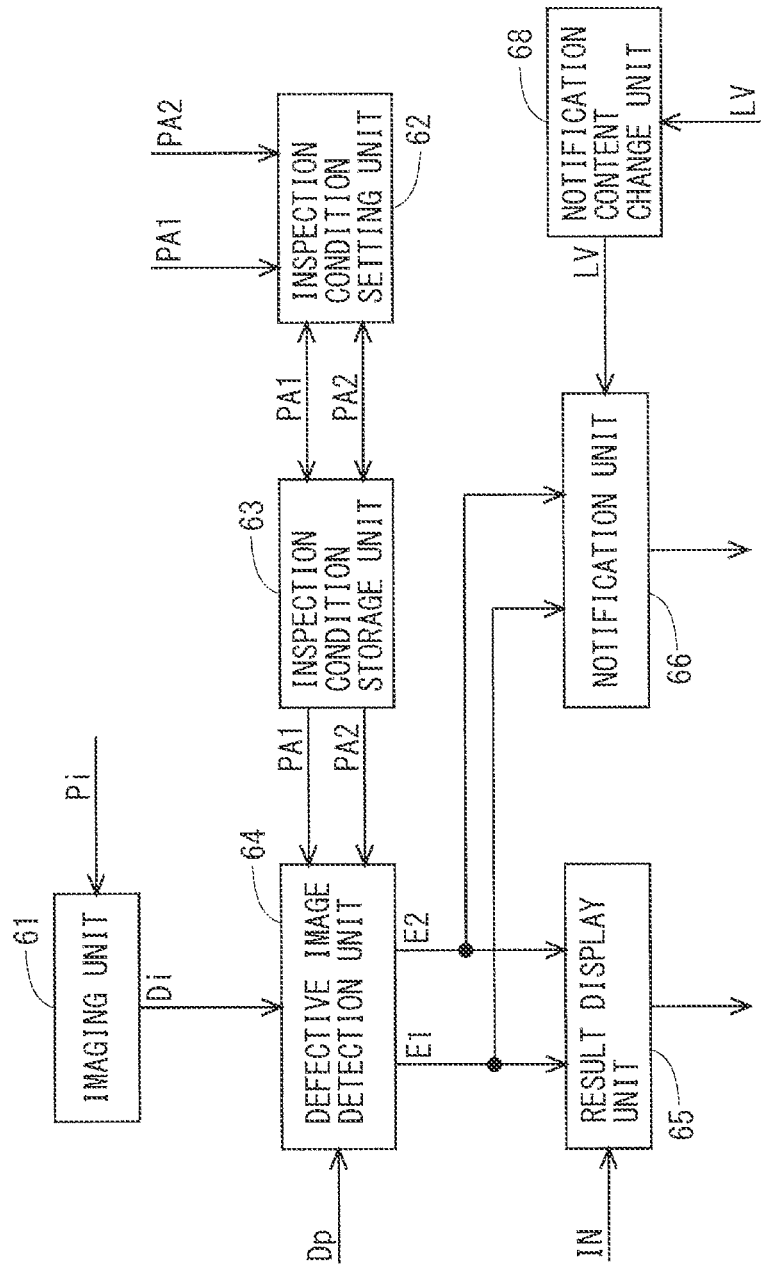
FIG. 28 is a block diagram showing a functional configuration of the image inspection device in a second modification.

FIG. 28 is a block diagram showing a functional configuration of the image inspection device 300 in the present modification. The image inspection device 300 in the present modification is provided with a notification content change unit 68 in addition to the components (see FIG. 4) provided in the first embodiment. Note that the notification content change unit 68 may be provided in addition to the components (see FIG. 17) provided in the second embodiment.

Figure 29:
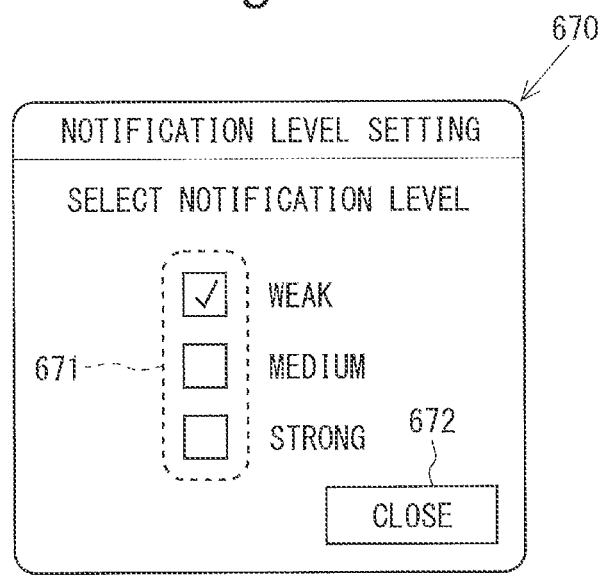
FIG. 29 is a diagram showing one example of a notification level setting screen in the second modification.

The notification content change unit 68 displays, on the display unit 36, a screen (hereinafter, referred to as a "notification level setting screen") 670 for the user to set a notification level for determining the notification content, and accepts an input by the user. FIG. 29 is a diagram showing one example of the notification level setting screen 670. This notification level setting screen 670 includes a notification level selection area 671 and a close button 672. In the notification level selection area 671, three check boxes corresponding to three notification levels ("weak", "medium", "strong") are provided. The user selects a notification level by clicking any one of the check boxes. Note that FIG. 29 shows an example in which "weak" is selected. The close button 672 is a button to be pressed when the user finishes the selection of the notification level using this notification level setting screen 670.

As above, the notification content change unit 68 accepts the selection of a notification level LV by the user. The notification content change unit 68 gives the accepted notification level LV to the notification unit 66. The notification unit 66 changes the notification content in accordance with the notification level LV given from the notification content change unit 68.

Hereinafter, an operation example regarding change of the notification content (change of the notification level) will be described. Here, as notification modes by the notification unit 66, three modes of "notification of information to a post-processing machine", "display of a message on the display unit 36", and "sounding of the tower lamp" are prepared. Moreover, by changing the notification level LV, it is possible to change the notification content for the result of the sub-inspection.

When the notification level LV is set to "weak", the following notification is performed by the notification unit 66. Even if a defective image is detected in the sub-inspection, a sheet including the defective image is not treated as spoilage by the post-processing machine (that is, the sheet including the defective image is not discarded). When a defective image is detected in the sub-inspection, information of the defective image is displayed on the display unit 36 as reference information. Even if a defective image is detected in the sub-inspection, the tower lamp does not sound.

When the notification level LV is set to "medium", the following notification is performed by the notification unit 66. Even if a defective image is detected in the sub-inspection, a sheet including the defective image is not treated as spoilage by the post-processing machine (that is, the sheet including the defective image is not discarded). When a defective image is detected in the sub-inspection, information of the defective image is displayed on the display unit 36 as reference information. When a defective image is detected in the sub-inspection, the tower lamp sounds.

When the notification level LV is set to "strong", the following notification is performed by the notification unit 66. When a defective image is detected in the sub-inspection, a sheet including the defective image is processed as spoilage by the post-processing machine (that is, the sheet including the defective image is discarded). When a defective image is detected in the sub-inspection, a message indicating that the sheet including the defective image is processed as spoilage is displayed on the display unit 36. When a defective image is detected in the sub-inspection, the tower lamp sounds.

As described above, according to the present modification, the user can select, from the plurality of levels, the content notified by the notification unit 66 when the defect is detected.

3.3 Third Modification

In the above embodiments, both the first parameter values PA1 and the second parameter values PA2 are set by the user. In other words, the user needs to set the inspection condition for the main inspection and the inspection condition for the sub-inspection. However, setting the plurality of inspection conditions places a heavy burden on the user. Therefore, in the present modification, a configuration in which the second parameter values PA2 are set by the inspection condition setting unit 62 is adopted. Note that while in the description of each of the above embodiments, the first parameter values PA1 and the second parameter values PA2 are associated with the inspection level, in the present modification, the first parameter values PA1 and the second parameter values PA2 will be described in association with the fatal degree. The higher the inspection level is, the lower the corresponding fatal degree is, and the lower the inspection level is, the higher the corresponding fatal degree is.

First, a case where the fatal degree corresponding to the second parameter values PA2 is lower than the fatal degree corresponding to the first parameter values PA1 (hereinafter, referred to as a "first case") will be described. Note that the case shown in FIG. 10 corresponds to the first case. That is, in the first case, the fatal degree corresponding to the second parameter values PA2 is lower than the fatal degree corresponding to the first parameter values PA1, a defective image having the fatal degree higher than the fatal degree corresponding to the first parameter values PA1 is detected by the first detection processing, and a defective image having the fatal degree higher than the fatal degree corresponding to the second parameter values PA2 and lower than the fatal degree corresponding to the first parameter values PA1 is detected by the second detection processing.

Figure 30:
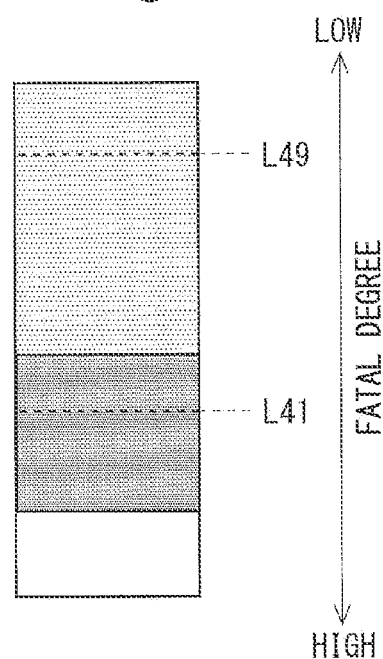
FIG. 30 is a diagram for describing a first case (case where a fatal degree corresponding to second parameter values is lower than a fatal degree corresponding to the first parameter values) in a third modification.

In the first case, values (hereinafter, referred to as "minimum limit values") corresponding to the lowest fatal degree among values that can be set as the second parameter values PA2 are internally determined in advance. The first parameter values PA1 are set by the user. Here, it is assumed that L41 in FIG. 30 is a fatal degree corresponding to the first parameter values PA1 set by the user. Moreover, it is assumed that L49 in FIG. 30 is a fatal degree corresponding to the predetermined minimum limit values. Instead of setting the second parameter values PA2, the user needs to designate a range level indicating a size of the inspection range of the sub-inspection (in other words, a size of target range in which a defective image is detected by the second detection processing). Therefore, in the present modification, the image inspection setting screen 7 is configured such that the range level can be designated (inputted) by the user. Note that here, it is assumed that three range levels ("narrow", "medium", "wide") are prepared.

Figure 31:
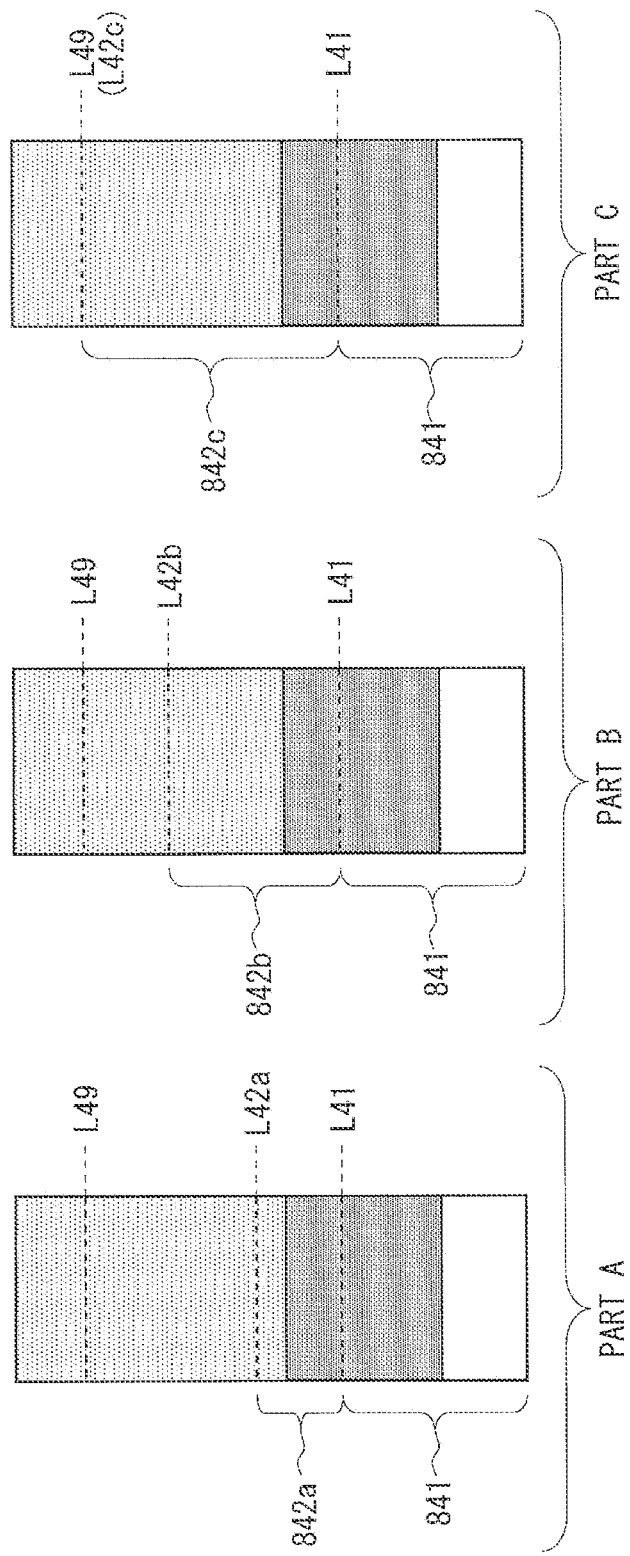
FIG. 31 is a diagram for describing setting of the second parameter values in the first case in the third modification.

Under the above assumption, the second parameter values PA2 are set by the inspection condition setting unit 62 as follows in accordance with the range level designated by the user. Note that regardless of the range level designated by the user, a range denoted by reference sign 841 in FIG. 31 is the inspection range of the main inspection. When "narrow" is designated by the user, the second parameter values PA2 are set such that a fatal degree L42*a* corresponding to a position of ⅓ up to the fatal degree L49 corresponding to the minimum limit values with the fatal degree L41 corresponding to the first parameter values PA1 as a reference is the fatal degree corresponding to the second parameter values PA2 (see the part A in FIG. 31). At this time, a range denoted by reference sign 842*a* is the inspection range of the sub-inspection. When "medium" is designated by the user, the second parameter values PA2 are set such that a fatal degree L42*b* corresponding to a position of ⅔ up to the fatal degree L49 corresponding to the minimum limit values with the fatal degree L41 corresponding to the first parameter values PA1 as a reference is the fatal degree corresponding to the second parameter values PA2 (see the part B in FIG. 31). At this time, a range denoted by reference sign 842*b* is the inspection range of the sub-inspection. When "wide" is designated by the user, the second parameter values PA2 are set such that the fatal degree L49 corresponding to the minimum limit values coincides with a fatal degree L42*c* corresponding to the second parameter values PA2 (see the part C in FIG. 31). At this time, a range denoted by reference sign 842*c* is the inspection range of the sub-inspection.

The first case will be further described with a specific example. Note that although the plurality of parameter values are actually set as the second parameter values PA, only the value of the defect width is focused on as the parameter value for convenience of description. For example, it is assumed that the minimum limit value is set to 0.3 mm in advance, and the defect width (first parameter value PA1) under the first inspection condition is set to 0.9 mm by the user. In this case, the defect width (second parameter value PA2) under the second inspection condition is set by the inspection condition setting unit 62 as follows in accordance with the range level designated by the user. When "narrow" is designated by the user, the defect width under the second inspection condition is set to 0.7 mm. At this time, a range of 0.7 mm to 0.9 mm with respect to the defect width is the inspection range of the sub-inspection. When "medium" is designated by the user, the defect width under the second inspection condition is set to 0.5 mm. At this time, a range of 0.5 mm to 0.9 mm with respect to the defect width is the inspection range of the sub-inspection. When "wide" is designated by the user, the defect width under the second inspection condition is set to 0.3 mm. At this time, a range of 0.3 mm to 0.9 mm with respect to the defect width is the inspection range of the sub-inspection.

As described above, in the first case, the minimum limit values that are values corresponding to the lowest fatal degree among the values that can be set as the second parameter values PA2 are determined in advance. The inspection condition setting unit 62 accepts the input of the first parameter values PA1 from an outside and the input of the range level from the outside, the range level indicating the size of the target range in which the defective image is detected by the second detection processing, and sets the second parameter values PA2 to values between the first parameter values PA1 and the minimum limit values in accordance with the range level inputted from the outside.

Next, a case where the fatal degree corresponding to the second parameter values PA2 is higher than the fatal degree corresponding to the first parameter values PA1 (hereinafter, referred to as a "second case") will be described. Note that the case shown in FIG. 11 corresponds to the second case. That is, in the second case, the fatal degree corresponding to the second parameter values PA2 is higher than the fatal degree corresponding to the first parameter values PA1, a defective image having the fatal degree higher than the fatal degree corresponding to the first parameter values PA1 is detected by the first detection processing, and a defective image having the fatal degree higher than the fatal degree corresponding to the second parameter values PA2 is detected by the second detection processing.

Figure 32:
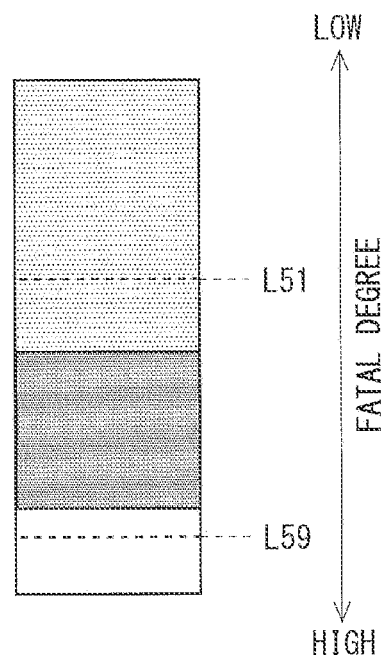
FIG. 32 is a diagram for describing a second case (case where a fatal degree corresponding to the second parameter values is higher than the fatal degree corresponding to the first parameter values) in the third modification.

In the second case, values (hereinafter, referred to as "maximum limit values") corresponding to the highest fatal degree among values that can be set as the second parameter values PA2 are internally determined in advance. The first parameter values PA1 are set by the user. Here, it is assumed that L51 in FIG. 32 is a fatal degree corresponding to the first parameter values PA1 set by the user. Moreover, it is assumed that L59 in FIG. 32 is a fatal degree corresponding to the predetermined maximum limit values. As in the first case, instead of setting the second parameter values PA2, the user needs to designate the range level indicating the size of the inspection range of the sub-inspection. Here, it is assumed that three range levels ("narrow", "medium", "wide") are also prepared.

Figure 33:
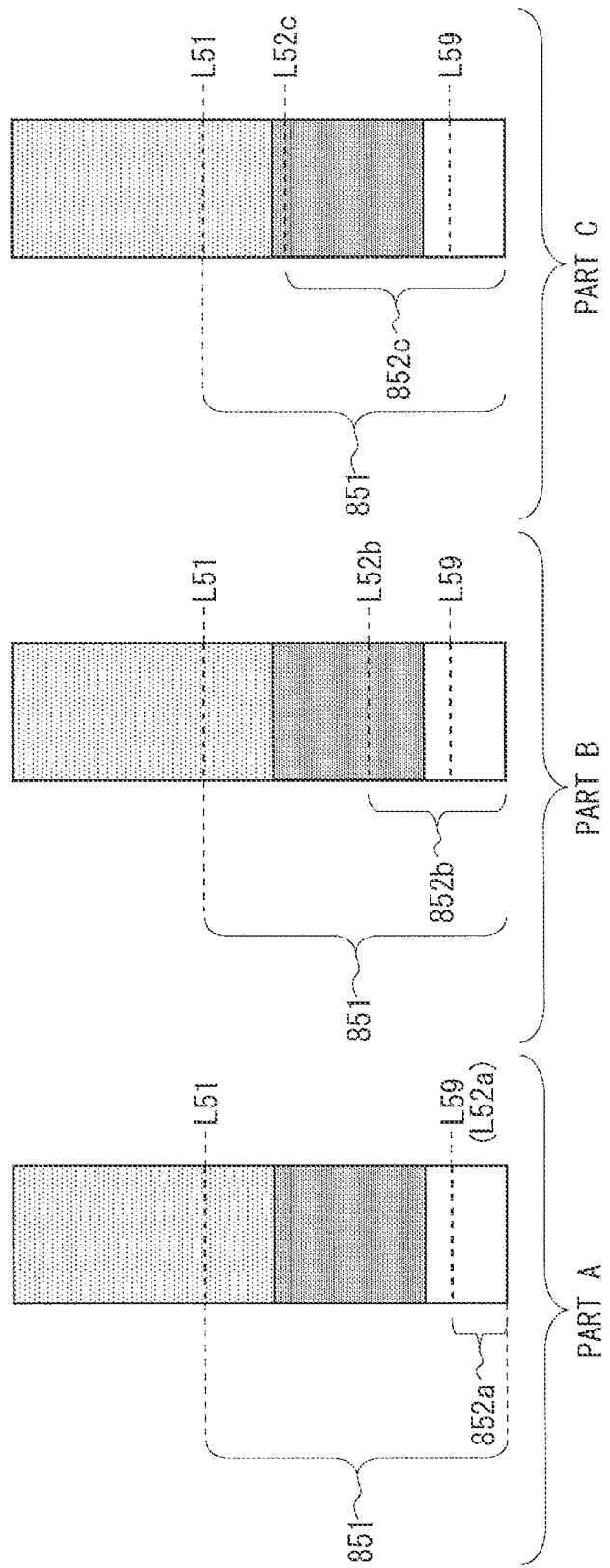
FIG. 33 is a diagram for describing setting of the second parameter values in the second case in the third modification.
Figure 34:
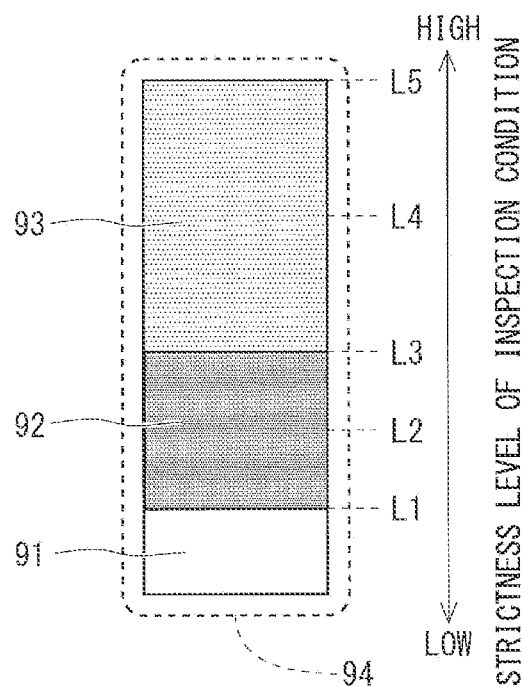
FIG. 34 is a diagram for describing a relationship between strictness of an inspection condition and a defect to be detected, regarding the conventional art.
Figure 35:
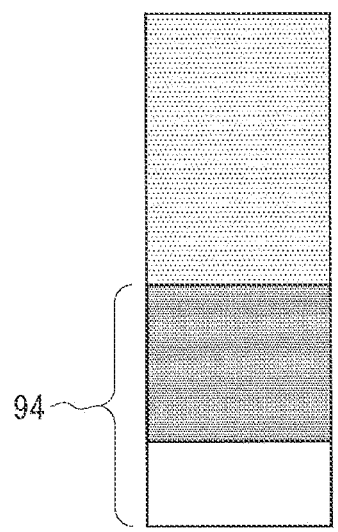
FIG. 35 is a diagram for describing a case where an ideal inspection result can be obtained, regarding the conventional art.
Figure 36:
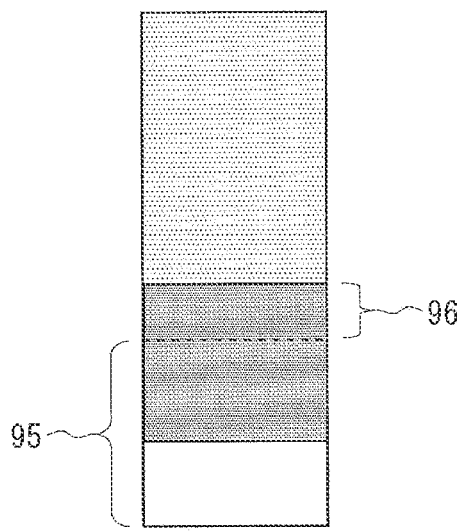
FIG. 36 is a diagram for describing a case where a printing accident may occur, regarding the conventional art.
Figure 37:
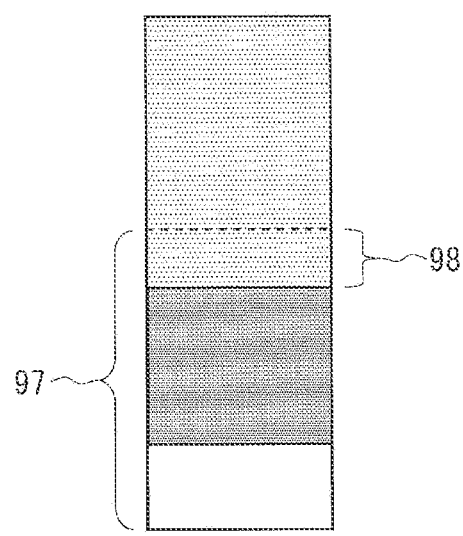
FIG. 37 is a diagram for describing a case where wasteful disposal of printed matters occurs, regarding the conventional art.

Under the above assumption, the second parameter values PA2 are set by the inspection condition setting unit 62 as follows in accordance with the range level designated by the user. Note that regardless of the range level designated by the user, a range denoted by reference sign 851 in FIG. 33 is the inspection range of the main inspection. When "narrow" is designated by the user, the second parameter values PA2 are set such that the fatal degree L59 corresponding to the maximum limit values coincides with a fatal degree L52a corresponding to the second parameter values PA2 (see the part A in FIG. 33). At this time, a range denoted by reference sign 852a is the inspection range of the sub-inspection. When "medium" is designated by the user, the second parameter values PA2 are set such that a fatal degree L52b corresponding to a position of ⅓ up to the fatal degree L51 corresponding to the first parameter values PA1 with the fatal degree L59 corresponding to the maximum limit values as a reference is the fatal degree corresponding to the second parameter values PA2 (see the part B in FIG. 33). At this time, a range denoted by reference sign 852b is the inspection range of the sub-inspection. When "wide" is designated by the user, the second parameter values PA2 are set such that a fatal degree L52c corresponding to a position of ⅔ up to the fatal degree L51 corresponding to the first parameter values PA1 with the fatal degree L59 corresponding to the maximum limit values as a reference is the fatal degree corresponding to the second parameter values PA2 (see the part C in FIG. 33). At this time, a range denoted by reference sign 852c is the inspection range of the sub-inspection.

The second case will also be further described with a specific example. Note that here as well, only the value of the defect width is focused on as the parameter value. For example, it is assumed that the maximum limit value is set to 1.5 mm in advance, and the defect width (first parameter value PA1) under the first inspection condition is set to 0.3 mm by the user. In this case, the defect width (second parameter value PA2) under the second inspection condition is set by the inspection condition setting unit 62 as follows in accordance with the range level designated by the user. When "narrow" is designated by the user, the defect width under the second inspection condition is set to 1.5 mm. At this time, a range defined as "1.5 mm or more" with respect to the defect width is the inspection range of the sub-inspection. When "medium" is designated by the user, the defect width under the second inspection condition is set to 1.1 mm. At this time, a range defined as "1.1 mm or more" with respect to the defect width is the inspection range of the sub-inspection. When "wide" is designated by the user, the defect width under the second inspection condition is set to 0.7 mm. At this time, a range defined as "0.7 mm or more" with respect to the defect width is the inspection range of the sub-inspection.

As described above, in the second case, the maximum limit values that are values corresponding to the highest fatal degree among the values that can be set as the second parameter values PA2 are determined in advance. The inspection condition setting unit 62 accepts the input of the first parameter values PA1 from the outside and the input of the range level from the outside, the range level indicating the size of the target range in which the defective image is detected by the second detection processing, and sets the second parameter values PA2 to values between the first parameter values PA1 and the maximum limit values in accordance with the range level inputted from the outside.

Next, a case where the user specifies a magnitude relationship between the fatal degree corresponding to the first parameter values PA1 and the fatal degree corresponding to the second parameter values PA2 will be described as a third case. In the third case, the above-described minimum limit values and the above-described maximum limit values are internally determined in advance. The first parameter values PA1 are set by the user. The range level may be designated by the user similarly to the first case and the second case, or may be internally determined.

Under the above assumption, the second parameter values PA2 are set by the inspection condition setting unit 62 as follows in accordance with the magnitude relationship designated by the user. Note that the inspection range of the main inspection is similar to that of the first case and the second case. When the user specifies that the fatal degree corresponding to the second parameter values PA2 is lower than the fatal degree corresponding to the first parameter values PA1, the second parameter values PA2 are set similarly to the first case. When the user specifies that the fatal degree corresponding to the second parameter values PA2 is higher than the fatal degree corresponding to the first parameter values PA1, the second parameter values PA2 are set similarly to the second case.

As described above, in the third case, the minimum limit values, which are values corresponding to the lowest fatal degree among the values that can be set as the second parameter values PA2, and the maximum limit values, which are values corresponding to the highest fatal degree among the values that can be set as the second parameter values PA2, are determined in advance. The inspection condition setting unit 62 accepts the input of the first parameter values PA1 from the outside, and the input of the magnitude relationship between the fatal degree corresponding to the first parameter values PA1 and the fatal degree corresponding to the second parameter values PA2 from the outside, and sets the second parameter values PA2 on the basis of the content inputted from the outside.

4. Appendix

From the above disclosure, an image inspection device having a configuration described below is also conceivable.

An image inspection device configured to perform inspection to detect a defective image included in a print image, the image inspection device including:
   an imaging device configured to perform capturing the print image and output a captured image obtained by the capturing,
   a processor; and
   a memory configured to store a program;
   wherein when the program stored in the memory is executed by the processor, the program causes the processor to:
   set, as an inspection condition, a first parameter value and a second parameter value that are two different determination criteria when detecting a defective image, and
   perform first detection processing of detecting a defective image from the captured image on the basis of the first parameter value, and second detection processing of detecting a defective image from the captured image on the basis of the second parameter value.

While the present invention has been described in detail above, the above description is illustrative in all aspects and is not restrictive. It is understood that numerous other modifications and variations can be devised without departing from the scope of the invention.

This application is an application claiming priority based on Japanese Patent Application No. 2021-152910 entitled "IMAGE INSPECTION DEVICE, PRINTING DEVICE INCLUDING THE SAME, AND IMAGE INSPECTION METHOD" filed on Sep. 21, 2021, and the contents of which are herein incorporated by reference.

What is claimed is:

1. An image inspection device configured to perform inspection to detect a defective image included in a print image, the image inspection device comprising:
   an inspection condition setting unit for setting a determination criterion when detecting a defective image, the determination criterion being set as an inspection condition;
   an imaging unit configured to perform capturing the print image and output a captured image obtained by the capturing; and
   a defective image detection unit configured to detect a defective image from the captured image on the basis of the inspection condition,
   wherein the inspection condition setting unit is configured to be able to set, as the inspection condition, a first parameter value and a second parameter value that are two different determination criteria for same matters,
   wherein the first parameter value is a combination of values of a plurality of parameters,
   wherein the second parameter value is a combination of values of the plurality of parameters,
   wherein the inspection condition setting unit displays an inspection setting screen for setting the first parameter value and the second parameter value and accepts an input of the first parameter value and the second parameter value from an outside, and
   wherein the defective image detection unit performs first detection processing of detecting a defective image from the captured image on the basis of the first parameter value, and second detection processing of detecting a defective image from the captured image on the basis of the second parameter value.

2. The image inspection device according to claim 1, further comprising a result display unit configured to display a defective image detected by the defective image detection unit as a result of inspection.

3. The image inspection device according to claim 1, further comprising an inspection condition storage unit configured to store the first parameter value and the second parameter value set by the inspection condition setting unit,
   wherein the inspection condition setting unit is configured to be able to read the first parameter value and the second parameter value stored in the inspection condition storage unit and reset the first parameter value and the second parameter value after completion of the first detection processing and the second detection processing.

4. The image inspection device according to claim 1, further comprising a notification unit configured to perform notification of content corresponding to a defective image detected by the defective image detection unit,
   wherein the notification unit performs notification that a sheet including the defective image is processed as spoilage, for the defective image detected by the first detection processing, and
   wherein the notification unit notifies information of the defective image as reference information, for the defective image detected by the second detection processing.

5. The image inspection device according to claim 4, wherein the notification unit performs notification to an external device configured to execute a pre-process or a post-process of a printing process performed by a printing device that has printed the print image.

6. The image inspection device according to claim 4, wherein the notification unit performs notification by displaying a message on a predetermined display unit.

7. The image inspection device according to claim 4, wherein the notification unit performs notification by voice.

8. The image inspection device according to claim 4, further comprising a notification content change unit configured to be able to select one of a plurality of notification levels prepared in advance, and configured to change content notified by the notification unit, in accordance with the selected notification level.

9. The image inspection device according to claim 8, wherein the notification content change unit changes content notified by the notification unit only for one of notification based on a defective image detected by the first detection processing and notification based on a defective image detected by the second detection processing.

10. The image inspection device according to claim 1,
    wherein a fatal degree corresponding to the second parameter value is lower than a fatal degree corresponding to the first parameter value,
    a defective image having a fatal degree higher than a fatal degree corresponding to the first parameter value is detected by the first detection processing, and
    a defective image having a fatal degree higher than a fatal degree corresponding to the second parameter value and lower than a fatal degree corresponding to the first parameter value is detected by the second detection processing.

11. The image inspection device according to claim 10,
    wherein a minimum limit value that is a value corresponding to a lowest fatal degree among values that can be set as the second parameter value is determined in advance, and
    the inspection condition setting unit accepts an input of the first parameter value from an outside and an input, from the outside, of a range level indicating a size of a target range in which a defective image is detected by the second detection processing, and sets the second parameter value to a value between the first parameter value and the minimum limit value in accordance with the range level inputted from the outside.

12. The image inspection device according to claim 1, wherein a fatal degree corresponding to the second parameter value is higher than a fatal degree corresponding to the first parameter value,
a defective image having a fatal degree higher than a fatal degree corresponding to the first parameter value is detected by the first detection processing, and
a defective image having a fatal degree higher than a fatal degree corresponding to the second parameter value is detected by the second detection processing.

13. The image inspection device according to claim 12, wherein a maximum limit value that is a value corresponding to a highest fatal degree among values that can be set as the second parameter value is determined in advance, and
the inspection condition setting unit accepts an input of the first parameter value from an outside and an input, from the outside, of a range level indicating a size of a target range in which a defective image is detected by the second detection processing, and sets the second parameter value to a value between the first parameter value and the maximum limit value in accordance with the range level inputted from the outside.

14. The image inspection device according to claim 1, wherein a minimum limit value that is a value corresponding to a lowest fatal degree among values that can be set as the second parameter value and a maximum limit value that is a value corresponding to a highest fatal degree among values that can be set as the second parameter value are determined in advance,
the inspection condition setting unit accepts an input of the first parameter value from an outside and an input of a magnitude relationship between a fatal degree corresponding to the first parameter value and a fatal degree corresponding to the second parameter value from the outside, and sets the second parameter value on the basis of content inputted from the outside,
when a fatal degree corresponding to the second parameter value set by the inspection condition setting unit is lower than a fatal degree corresponding to the first parameter value inputted from the outside,
a defective image having a fatal degree higher than a fatal degree corresponding to the first parameter value is detected by the first detection processing, and
a defective image having a fatal degree higher than a fatal degree corresponding to the second parameter value and lower than a fatal degree corresponding to the first parameter value is detected by the second detection processing, and
when a fatal degree corresponding to the second parameter value set by the inspection condition setting unit is higher than a fatal degree corresponding to the first parameter value inputted from the outside,
a defective image having a fatal degree higher than a fatal degree corresponding to the first parameter value is detected by the first detection processing, and
a defective image having a fatal degree higher than a fatal degree corresponding to the second parameter value is detected by the second detection processing.

15. An image inspection device configured to configured to perform inspection to detect a defective image included in a print image, the image inspection device comprising:
an inspection condition setting unit for setting a determination criterion when detecting a defective image, the determination criterion being set as an inspection condition;
an imaging unit configured to perform capturing the print image and output a captured image obtained by the capturing; and
a defective image detection unit configured to detect a defective image from the captured image on the basis of the inspection condition,
wherein the inspection condition setting unit is configured to be able to set, as the inspection condition, a first parameter value and a second parameter value that are two different determination criteria,
wherein the defective image detection unit performs first detection processing of detecting a defective image from the captured image on the basis of the first parameter value, and second detection processing of detecting a defective image from the captured image on the basis of the second parameter value,
wherein the defective image detection unit includes:
a defect detection processing unit configured to perform the first detection processing and the second detection processing; and
a filter unit that includes a learnt artificial intelligence model for determining whether a given image is a good image or a faulty image, the filter unit configured to extract a part of defective images from the defective images detected by the defect detection processing unit,
wherein the defective images detected by the defect detection processing unit are given to the artificial intelligence model, and
wherein the filter unit extracts a defective image determined to be a faulty image by the artificial intelligence model.

16. The image inspection device according to claim 15, wherein both a defective image detected in the first detection processing and a defective image detected in the second detection processing are given to the artificial intelligence model.

17. The image inspection device according to claim 15, wherein only any one of a defective image detected in the first detection processing and a defective image detected in the second detection processing is given to the artificial intelligence model.

18. The image inspection device according to claim 15, further comprising a relearning execution unit configured to cause the artificial intelligence model to execute relearning by giving a defective image selected from defective images detected by the defective image detection unit and a determination result indicating whether the selected defective image is a good image or a faulty image to the artificial intelligence model.

19. An image inspection method for performing inspection to detect a defective image included in a print image, the method comprising:
an inspection condition setting step of setting, by a worker, a determination criterion when detecting a defective image, the determination criterion being set as an inspection condition;
an imaging step of capturing, by an imaging device, the print image; and
a defective image detection step of detecting, by a computer, a defective image from a captured image obtained in the imaging step on the basis of the inspection condition, wherein, in the inspection condition setting step, at least one of a first parameter value and a second parameter value that are two different determination criteria for same matters is set, as the inspection condition, by the worker, wherein the first parameter value is a combination of values of a plurality of parameters, wherein the second parameter value is a combination of values of the plurality of parameters, wherein, in the inspection condition setting, an inspection setting screen for setting the first parameter value and the second parameter value is displayed and an input of the at least one of the first parameter value and the second parameter value by the worker is accepted, and wherein, in the defective image detection step, first detection processing of detecting a defective image from the captured image on the basis of the first parameter value, and second detection processing of detecting a defective image from the captured image on the basis of the second parameter value are performed.

* * * * *